United States Patent
Handa et al.

(10) Patent No.: US 8,274,570 B2
(45) Date of Patent: Sep. 25, 2012

(54) IMAGE PROCESSING APPARATUS, IMAGE PROCESSING METHOD, HAND SHAKE BLUR AREA ESTIMATION DEVICE, HAND SHAKE BLUR AREA ESTIMATION METHOD, AND PROGRAM

(75) Inventors: Masaki Handa, Kanagawa (JP); Tomoyuki Otsuki, Kanagawa (JP); Kenji Takahashi, Kanagawa (JP); Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 606 days.

(21) Appl. No.: 12/414,224

(22) Filed: Mar. 30, 2009

(65) Prior Publication Data

US 2009/0225174 A1 Sep. 10, 2009

(30) Foreign Application Priority Data

Apr. 3, 2008 (JP) ................................. 2008-096991

(51) Int. Cl.
*H04N 5/228* (2006.01)
(52) U.S. Cl. .............. 348/208.3; 348/208.99; 348/208.6
(58) Field of Classification Search ... 348/208.99–208.6
See application file for complete search history.

(56) References Cited

U.S. PATENT DOCUMENTS

| | | | | |
|---|---|---|---|---|
| 5,453,800 A | * | 9/1995 | Kondo et al. | 348/699 |
| 5,959,666 A | | 9/1999 | Naganuma et al. | |
| 7,436,436 B2 | * | 10/2008 | Tanaka | 348/208.4 |
| 7,684,684 B2 | * | 3/2010 | Honma | 396/52 |
| 7,826,730 B2 | * | 11/2010 | Wakamatsu et al. | 396/55 |
| 2002/0063779 A1 | * | 5/2002 | Kaneda et al. | 348/208 |
| 2002/0163581 A1 | * | 11/2002 | Kitazawa et al. | 348/208.6 |
| 2005/0093993 A1 | * | 5/2005 | Tanaka | 348/222.1 |
| 2006/0256231 A1 | * | 11/2006 | Sasaki et al. | 348/373 |
| 2007/0009242 A1 | * | 1/2007 | Okada | 396/52 |
| 2007/0188619 A1 | * | 8/2007 | Kurata | 348/208.99 |
| 2008/0186386 A1 | * | 8/2008 | Okada et al. | 348/208.4 |
| 2009/0021590 A1 | * | 1/2009 | Shimizu | 348/208.99 |

FOREIGN PATENT DOCUMENTS

| | | |
|---|---|---|
| JP | 8-331430 | 12/1996 |
| JP | 11-183951 | 7/1999 |
| JP | 11-284902 | 10/1999 |
| JP | 2002-359768 | 12/2002 |
| JP | 2006-186885 | 7/2006 |

* cited by examiner

*Primary Examiner* — Sinh Tran
*Assistant Examiner* — Christopher K Peterson
(74) *Attorney, Agent, or Firm* — Oblon, Spivak, McClelland, Maier & Neustadt, L.L.P.

(57) ABSTRACT

An image processing apparatus for correcting hand shake blur in a moving image includes a generation unit that generates, by setting an image among images constituting the moving image as a reference image and the remaining images as correction target images, a correction amount by which position displacement of a correction target image relative to the reference image is corrected; an estimation unit that estimates a hand shake blur area where hand shake blur relative to the reference image has occurred, on the basis of the correction amount; a detection unit that detects a composition changing operation on the basis of the correction amount; and an updating unit that updates a correction area to an area where hand shake blur in the correction target image relative to the reference image is corrected on the basis of the hand shake blur area and a detection result.

12 Claims, 28 Drawing Sheets

IMAGE PROCESSING APPARATUS, IMAGE PROCESSING METHOD, HAND SHAKE BLUR AREA ESTIMATION DEVICE, HAND SHAKE BLUR AREA ESTIMATION METHOD, AND PROGRAM

BACKGROUND OF THE INVENTION

1. Field of the Invention

The present invention relates to image processing apparatuses, image processing methods, hand shake blur area estimation devices, hand shake blur area estimation methods, and programs, and more particularly, to an image processing apparatus, an image processing method, a hand shake blur area estimation device, a hand shake blur area estimation method, and a program that are suitably used, for example, in a case where hand shake blur occurring at the time of capturing an image is estimated and corrected.

2. Description of the Related Art

There have been proposed various hand shake blur correction methods, such as a method for correcting hand shake blur on the basis of the motion of a video camera detected by an angular velocity sensor, a gyro-sensor, or the like provided in the video camera and a method for calculating a correction amount by which hand shake blur is to be corrected, on the basis of a motion vector detected from captured images captured by a video camera, and correcting the hand shake blur on the basis of the calculated correction amount.

That is, for example, in hand shake blur correction methods of the related art, in a case where a specific motion amount representing the motion of a video camera is equal to or greater than a predetermined threshold, it is determined that a picture composition changing operation, such as panning or tilting, has been intentionally performed by a photographer. Thus, image blur in a captured image caused by the picture composition changing operation is not corrected or the degree to which the image blur is corrected is reduced.

Meanwhile, in a case where the amount of motion of the video camera is smaller than the predetermined threshold, it is determined that the video camera has vibrated because of hand shake of the photographer. Thus, blur in a captured image caused by hand shake of the photographer is corrected.

A method for detecting a specific motion amount representing the motion of a video camera on the basis of angular velocity acquired by an angular velocity sensor and determining that panning or tilting has been performed in a case where the amount of motion is kept equal to or greater than a threshold during a predetermined period of time is described, for example, in Japanese Unexamined Patent Application Publication No. 11-183951.

In addition, a method for setting a convergent mode where the amount of correction is reduced as much as possible as in the case of panning or tilting, when motion vector data does not exceed a predetermined threshold during a predetermined period of time corresponding to thirty fields, is described, for example, in Japanese Unexamined Patent Application Publication No. 8-331430.

SUMMARY OF THE INVENTION

However, in the methods described in Japanese Unexamined Patent Application Publication Nos. 11-183951 and 8-331430, since the degree of hand shake differs from photographer to photographer, it is difficult to set an optimal threshold for determining whether the motion of a video camera is related to a panning or tilting operation performed by a photographer or related to hand shake of the photographer.

Thus, the determination of whether the motion of the video camera is related to a panning or tilting operation performed by the photographer or related to hand shake of the photographer may be performed incorrectly. In this case, hand shake blur is not corrected properly.

That is, for example, in a case where a small value is set as a threshold regarding the motion amount of a video camera in order to quickly detect a panning or tilting operation, a mere hand shake may be incorrectly determined to be an intentional panning or tilting operation. In this case, hand shake blur is not corrected properly.

Meanwhile, in a case where a large value is set as a threshold regarding the amount of motion of a video camera in order to prevent hand shake from being incorrectly determined to be a panning or tilting operation, an intentional panning or tilting operation may be incorrectly determined to be hand shake. In this case, a panning or tilting operation intentionally performed by a photographer may be determined to be hand shake, and thus hand shake blur may be corrected.

It is desirable to estimate a hand shake, the degree of which differs from photographer to photographer, and correct hand shake blur properly.

According to a first embodiment of the present invention, an image processing apparatus for correcting hand shake blur occurring at the time of capturing the moving image includes the following elements: or a program for causing a computer to function as an image processing apparatus for correcting hand shake blur occurring at the time of capturing the moving image causes the computer to function as the following elements: generation means for generating, by setting a specific image among a plurality of images constituting the moving image as a reference image serving as a reference of a hand shake blur correction process and setting the remaining images as correction target images to be subjected to the hand shake blur correction process, a correction amount by which position displacement of a correction target image relative to the reference image is to be corrected; estimation means for estimating a hand shake blur area representing an area where hand shake blur relative to the reference image has occurred, on the basis of the correction amount generated by the generation means; detection means for detecting an intentional picture composition changing operation at the time of capturing the correction target image, on the basis of the correction amount generated by the generation means; and updating means for updating a set correction area to an area where hand shake blur in the correction target image relative to the reference image is to be corrected on the basis of the hand shake blur area estimated by the estimation means and a result of the detection performed by the detection means.

In the image processing apparatus or the program, the correction target images may follow the reference image in an order in which the images were captured. In a case where at least one of a horizontal component and a vertical component of a correction amount for a first correction target image is greater than a corresponding component of a correction amount for a second correction target image following the first correction target image, the estimation means may estimate the hand shake blur area on the basis of the correction amount for the first correction target image. The detection means may detect, on the basis of the correction amount for the first correction target image, whether or not at least one of panning and tilting was performed at the time of capturing the first correction target image. The updating means may update the correction area for the second correction target image on the basis of the hand shake blur area estimated by the estimation means and the result of the detection performed by the detection means.

The image processing apparatus or the program may further include limiting means for limiting the correction amount for the correction target image to an actual correction amount by which the hand shake blur in the correction target image relative to the reference image is to be corrected, on the basis of the correction area; and correction means for generating a corrected image where the hand shake blur in the correction target image relative to the reference image has been corrected on the basis of the actual correction amount.

In the image processing apparatus or the program, in a case where the correction area has not been updated during a predetermined period of time, the updating means may reduce the size of the correction area.

In the image processing apparatus or the program, in a case where the correction area has not been updated during the predetermined period of time, the updating means may reduce the size of the correction area on the basis of the distribution of correction amounts generated by the generation means.

In the image processing apparatus or the program, in a case where the correction area has not been updated during the predetermined period of time, the updating means may reduce the size of the correction area with a specific reduction ratio.

In the image processing apparatus or the program, in a case where the hand shake blur area estimated by the estimation means does not fall within the correction area and neither panning nor tilting at the time of capturing the correction target image has been detected by the detection means, the updating means may update the correction area on the basis of the hand shake blur area.

In the image processing apparatus or the program, the correction means may generate the corrected image by extracting a specific area within the correction target image on the basis of the actual correction amount and enlarging the extracted specific area.

The image processing apparatus or the program may further include capturing means for capturing the moving image.

According to the first embodiment of the present invention, an image processing method for use in an image processing apparatus for correcting hand shake blur in a moving image caused by hand shake occurring at the time of capturing the moving image includes the steps of setting a specific image among a plurality of images constituting the moving image as a reference image serving as a reference of a hand shake blur correction process; generating, by setting the remaining images as correction target images to be subjected to the hand shake blur correction process, a correction amount by which position displacement of a correction target image relative to the reference image is to be corrected; estimating a hand shake blur area representing an area where hand shake blur relative to the reference image has occurred, on the basis of the generated correction amount; detecting an intentional picture composition changing operation at the time of capturing the correction target image, on the basis of the generated correction amount; and updating a set correction area to an area where hand shake blur in the correction target image relative to the reference image is to be corrected on the basis of the estimated hand shake blur area and a result of the detection.

According to the first embodiment of the present invention, by setting a specific image among a plurality of images constituting a moving image as a reference image serving as a reference of a hand shake blur correction process and setting the remaining images as correction target images to be subjected to the hand shake blur correction process, a correction amount by which position displacement of a correction target image relative to the reference image is to be corrected is generated. A hand shake blur area representing an area where hand shake blur relative to the reference image has occurred is estimated on the basis of the generated correction amount. An intentional picture composition changing operation at the time of capturing the correction target image is detected on the basis of the generated correction amount. A set correction area is updated to an area where hand shake blur in the correction target image relative to the reference image is to be corrected, on the basis of the estimated hand shake blur area and a result of the detection.

According to a second embodiment of the present invention, a hand shake blur area estimation device for estimating hand shake blur in a moving image caused by hand shake occurring at the time of capturing the moving image includes the following elements: or a program for causing a computer to function as a hand shake blur area estimation device for estimating hand shake blur in a moving image caused by hand shake occurring at the time of capturing the moving image causes the computer to function as the following elements: detection means for detecting, by setting a specific image among a plurality of images constituting the moving image as a reference image serving as a reference of a hand shake blur area estimation process, a motion vector representing motion of each of the remaining images relative to the reference image; and estimation means for estimating a hand shake blur area representing an area where hand shake blur relative to the reference image has occurred, on the basis of the motion vector detected by the detection means.

According to the second embodiment of the present invention, a hand shake blur area estimation method for use in a hand shake blur area estimation device for estimating hand shake blur occurring at the time of capturing the moving image includes the steps of detecting, by setting a specific image among a plurality of images constituting the moving image as a reference image serving as a reference of a hand shake blur area estimation process, a motion vector representing motion of each of the remaining images relative to the reference image; and estimating a hand shake blur area representing an area where hand shake blur relative to the reference image has occurred, on the basis of the detected motion vector.

According to the second embodiment of the present invention, by setting a specific image among a plurality of images constituting a moving image as a reference image serving as a reference of a hand shake blur area estimation process, a motion vector representing motion of each of the remaining images relative to the reference image is detected. A hand shake blur area representing an area where hand shake blur relative to the reference image has occurred is estimated on the basis of the detected motion vector.

According to an embodiment of the present invention, a hand shake, the degree of which differs from photographer to photographer, can be estimated, and hand shake blur can be properly corrected.

DESCRIPTION OF THE PREFERRED EMBODIMENTS

Embodiments of the present invention will be described with reference to the drawings.

Figure 1:
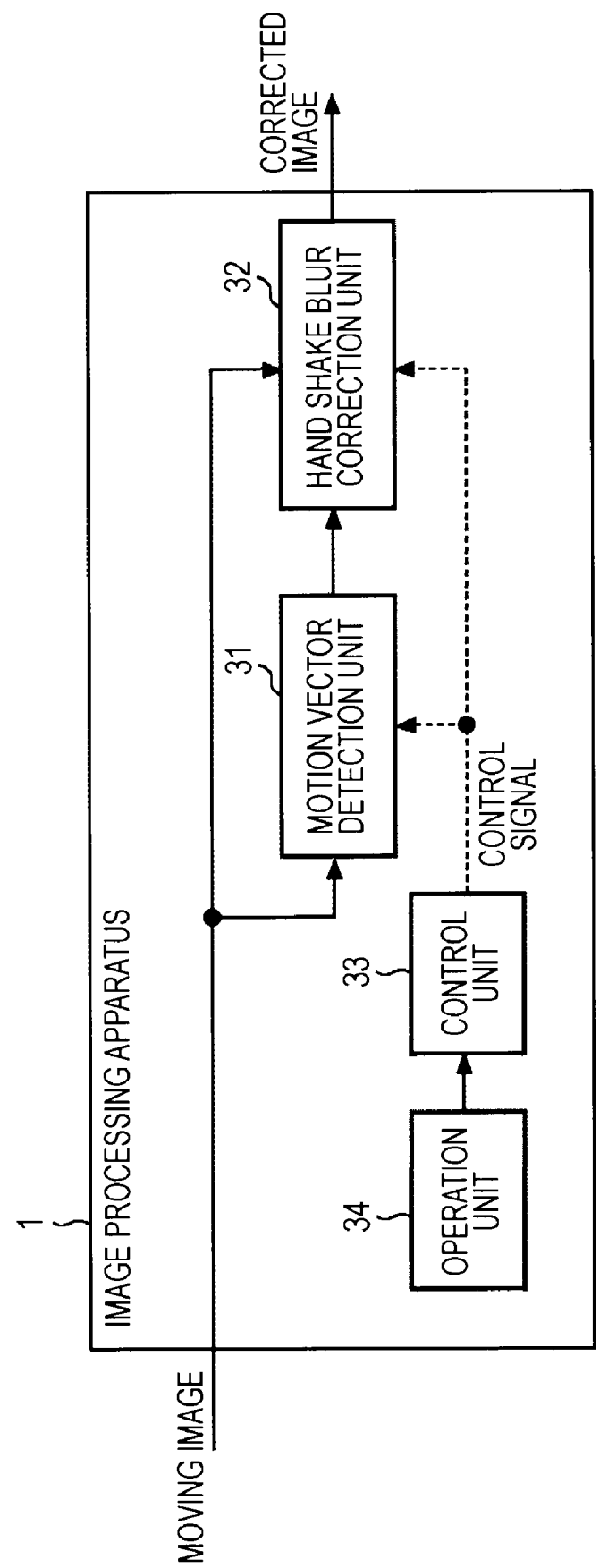
FIG. 1 is a block diagram showing an example of the configuration of an image processing apparatus according to an embodiment of the present invention.

FIG. 1 shows an example of the configuration of an image processing apparatus according to an embodiment of the present invention.

An image processing apparatus 1 includes a motion vector detection unit 31, a hand shake blur correction unit 32, a control unit 33, and an operation unit 34.

A moving image constituted by a plurality of frames (or fields) that are consecutive in the order in which the frames (or fields) were captured is supplied from a storage unit (not illustrated) to the motion vector detection unit 31 and the hand shake blur correction unit 32. Note that moving images captured by a video camera including an image pickup device, such as a charge-coupled device (CCD) or a complementary metal-oxide semiconductor (CMOS), are stored in advance in the storage unit.

The motion vector detection unit 31 detects, for example, in accordance with a block matching method, motion vectors for individual frames of the supplied moving image, and supplies the detected motion vectors to the hand shake blur correction unit 32. The details of the block matching method will be described later with reference to FIG. 2.

The hand shake blur correction unit 32 corrects, on the basis of the motion vectors for individual frames of the moving image supplied from the motion vector detection unit 31, hand shake blur in the individual frames of the supplied moving image caused by hand shake blur occurring at the time of capturing the image, and outputs a resultant corrected image to a subsequent unit (for example, a monitor, which is not illustrated).

The control unit 33 controls the motion vector detection unit 31 and the hand shake blur correction unit 32 in accordance with an operation signal from the operation unit 34.

The operation unit 34 includes, for example, a key to be used for designating a designated position 41 (see FIGS. 3A and 3B), a key to be used for changing a corrected display possible area L (see FIGS. 4A and 4B) within which the extracted center of an extracted box e can be moved, and the like. In response to a key operation performed by a user, the operation unit 34 supplies an operation signal corresponding to the key operation to the control unit 33.

Figure 2:
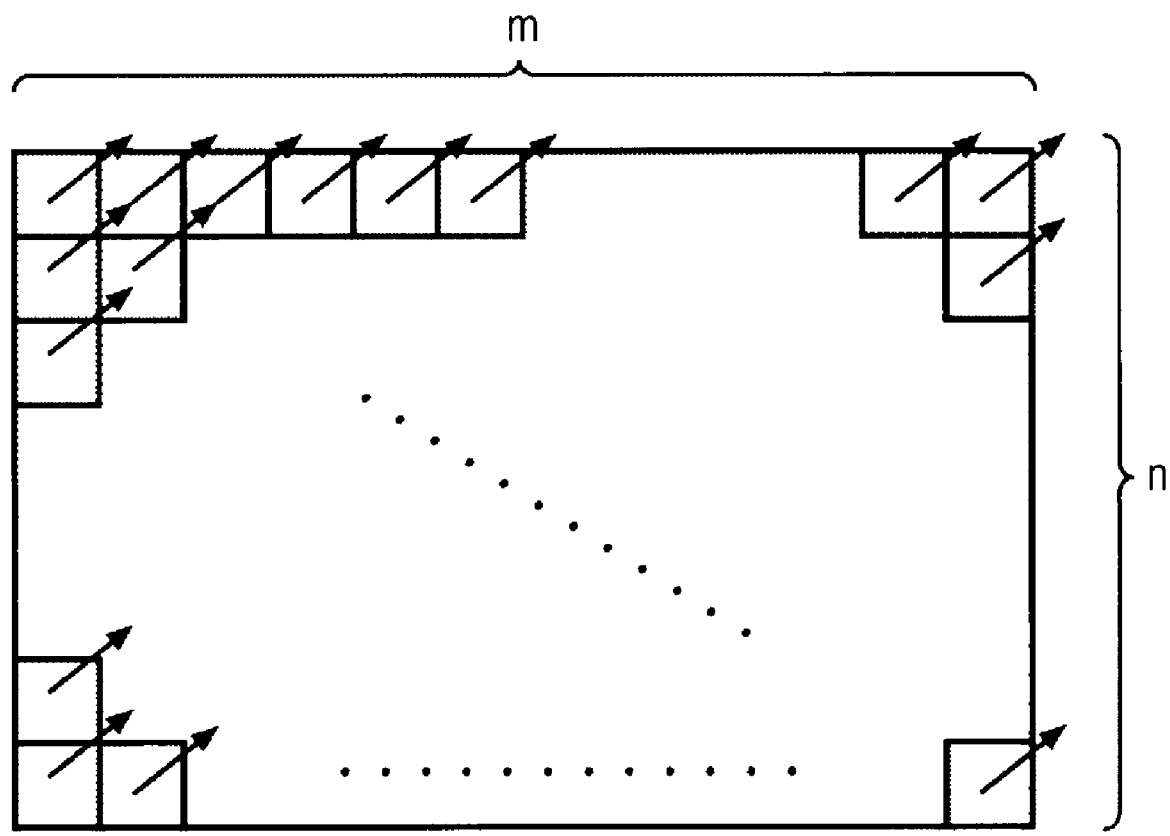
FIG. 2 is an explanatory diagram for explaining a detection method for detecting a motion vector.

FIG. 2 is an explanatory diagram for explaining a detection method for detecting, by the motion vector detection unit 31, a motion vector in accordance with a block matching method.

The motion vector detection unit 31 sequentially sets individual frames of a moving image as target frames, and divides a target frame into m×n blocks, as shown in FIG. 2. Then, the motion vector detection unit 31 acquires, from a frame following the target frame, regions (similar regions) that are the most similar to individual blocks in the target frame. Accordingly, the motion vector detection unit 31 detects a motion vector representing the motion of a similar region in a certain frame, relative to a corresponding block in a target frame.

Figure 3A:
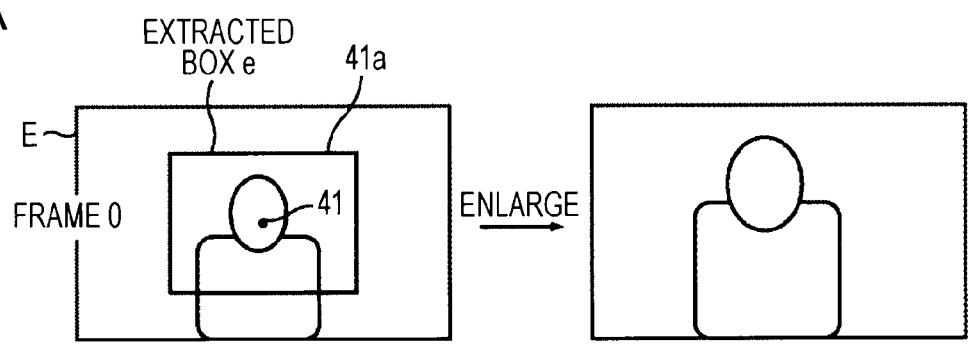
FIGS. 3A and 3B are explanatory diagrams for explaining the overview of a hand shake blur correction process.
Figure 3B:
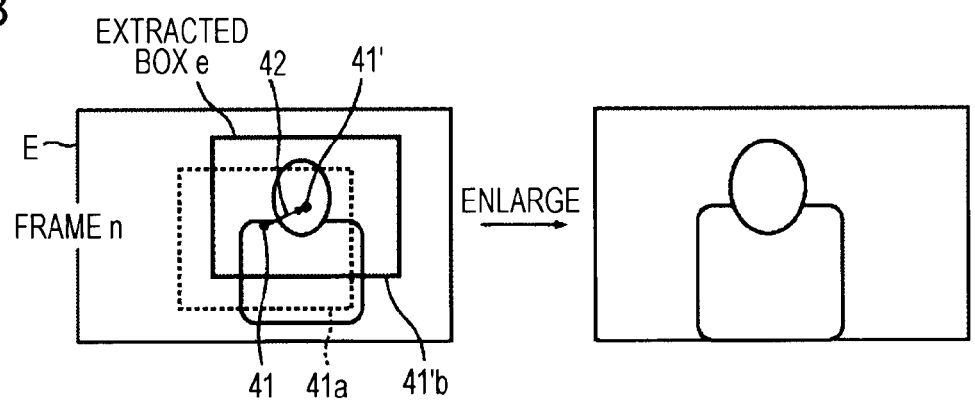

FIGS. 3A and 3B are explanatory diagrams for explaining the overview of a hand shake blur correction process for correcting, by the image processing apparatus 1, hand shake blur caused by hand shake occurring at the time of capturing an image.

A frame 0 shown on the left-hand side of FIG. 3A represents a specific frame among a plurality of frames constituting a moving image. A frame shown on the right-hand side of FIG. 3A represents a corrected image corresponding to the frame 0.

A frame n shown on the left-hand side of FIG. 3B represents a frame that is n frames following the frame 0. A frame shown on the right-hand side of FIG. 3B represents a corrected image corresponding to the frame n.

In the hand shake blur correction process, as shown on the left-hand side of FIG. 3A and the left-hand side of FIG. 3B, an extracted box e, which defines the size of an area to be extracted and enlarged to a specific size, is set inside a captured region E, which corresponds to the size of the entire captured image captured by the video camera. Hand shake blur is corrected by moving the extracted box e within the captured region E in accordance with an actual correction amount 42 by which hand shake blur is to be corrected.

That is, for example, as shown on the left-hand side of FIG. 3A, the image processing apparatus 1 (the hand shake blur correction unit 32) sets a specific frame among a plurality of frames constituting a moving image as a reference frame (frame 0), which serves as a reference of the hand shake blur correction process for correcting hand shake blur occurring at the time of capturing the image.

In addition, the image processing apparatus 1 extracts, from the frame 0, an area 41a, which is defined by the extracted box e centered on the designated position 41 designated in accordance with a key operation performed by the user, and enlarges the area 41a to a specific size, such as the same size as the captured region E. Then, the image processing apparatus 1 outputs a resultant corrected image (see the right-hand side of FIG. 3A). Note that, on the left-hand side of FIG. 3A, the designated position 41 represents the center of the frame 0.

The image processing apparatus 1 generates an actual correction amount 42 by which hand shake blur in the frame n (see the left-hand side of FIG. 3B) relative to the frame 0 (see the left-hand side of FIG. 3A) is to be corrected.

In addition, as shown on the left-hand side of FIG. 3B, the image processing apparatus 1 moves, from the designated position 41 to a position 41', the extracted center representing the center of the extracted box e, on the basis of the actual correction amount 42 by which hand shake blur relative to the frame 0 is to be corrected.

Furthermore, the image processing apparatus 1 extracts, from the frame n, an area 41'b defined by the extracted box e centered on the moved extracted center 41', and enlarges the area 41'b to a specific size, such as the same size as the captured region E. Then, the image processing apparatus 1 outputs a resultant corrected image (see the right-hand side of FIG. 3B) where hand shake blur in the frame n has been corrected.

A corrected display possible area L, which represents an area within which the extracted center of the extracted box e can be moved, will be described with reference to FIGS. 4A and 4B.

Since the captured region E and the extracted box e have already been explained with reference to FIGS. 3A and 3B, the captured region E and the extracted box e will not be described with reference to FIGS. 4A and 4B. Hereinafter, the same is applied to other drawings.

Figure 4A:
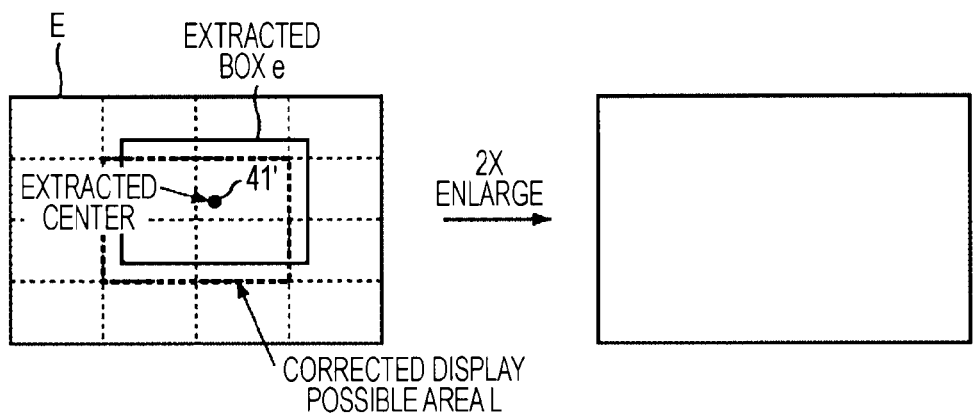
FIGS. 4A and 4B are explanatory diagrams for explaining a corrected display possible area.
Figure 4B:
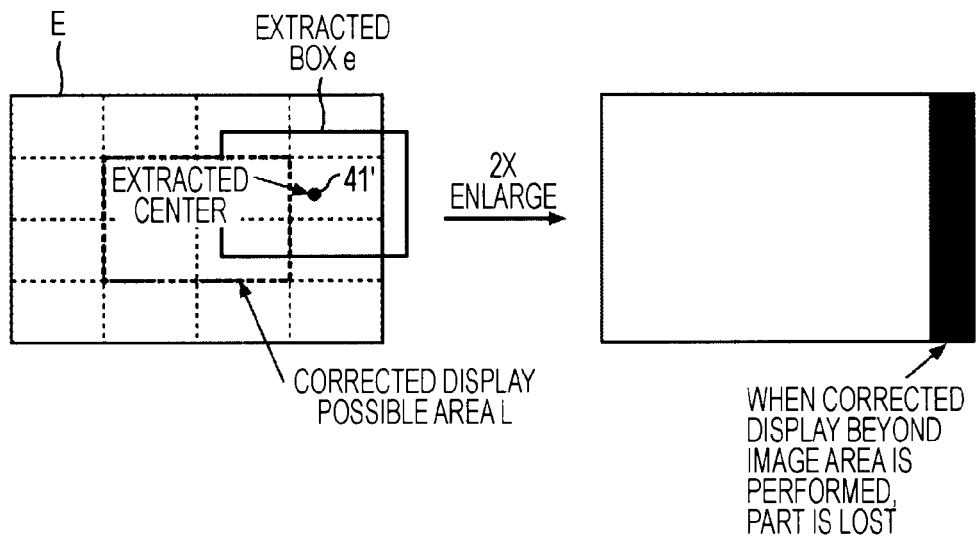

In addition, in FIGS. 4A and 4B, broken lines dividing the captured region E into sixteen rectangular sections (four sections in the horizontal direction and four sections in the vertical direction) having the same shapes are provided, for the sake of convenience, to clarify the position and the like of the extracted box e.

Furthermore, in FIGS. 4A and 4B, among sixteen rectangular sections, four rectangular sections, that is, two sections in the horizontal direction and two sections in the vertical direction existing at the center of the captured region E, are set as the corrected display possible area L. In addition, the size of the extracted box e is the same as the size of the four rectangular sections, that is, two sections in the horizontal direction and two sections in the vertical direction.

As shown on the left-hand side of FIG. 4A, in a case where the extracted center 41' exists within the corrected display possible area L, since the extracted box e centered on the extracted center 41' exists within the captured region E, the entire extracted box e can be extracted from the captured region E.

Thus, as shown on the right-hand side of FIG. 4A, there is no image missing in a corrected image obtained by doubling the horizontal length and the vertical length of the rectangular sections extracted on the basis of the extracted box e to have the same size as the captured region E.

Meanwhile, as shown on the left-hand side of FIG. 4B, in a case where the extracted center 41' does not exist within the corrected display possible area L, the extracted box e centered on the extracted center 41' extends beyond the captured region E. Thus, a portion that includes no captured image to be extracted may exist within the extracted box e.

Thus, as shown on the right-hand side of FIG. 4B, image missing occurs in a right side portion (shown in black) of a corrected image obtained by doubling the horizontal length and the vertical length of the rectangular sections extracted on the basis of the extracted box e to have the same size as the captured region E.

Therefore, in the hand shake blur correction process, in order not to generate image missing in a corrected image, it is necessary to set the extracted center to be within the corrected display possible area L.

Note that, as the size of the extracted box e increases, a range within which the extracted box e can be moved in the captured region E, that is, the size of the corrected display possible area L within which the extracted center of the extracted box e can be moved, is reduced.

Figure 5:
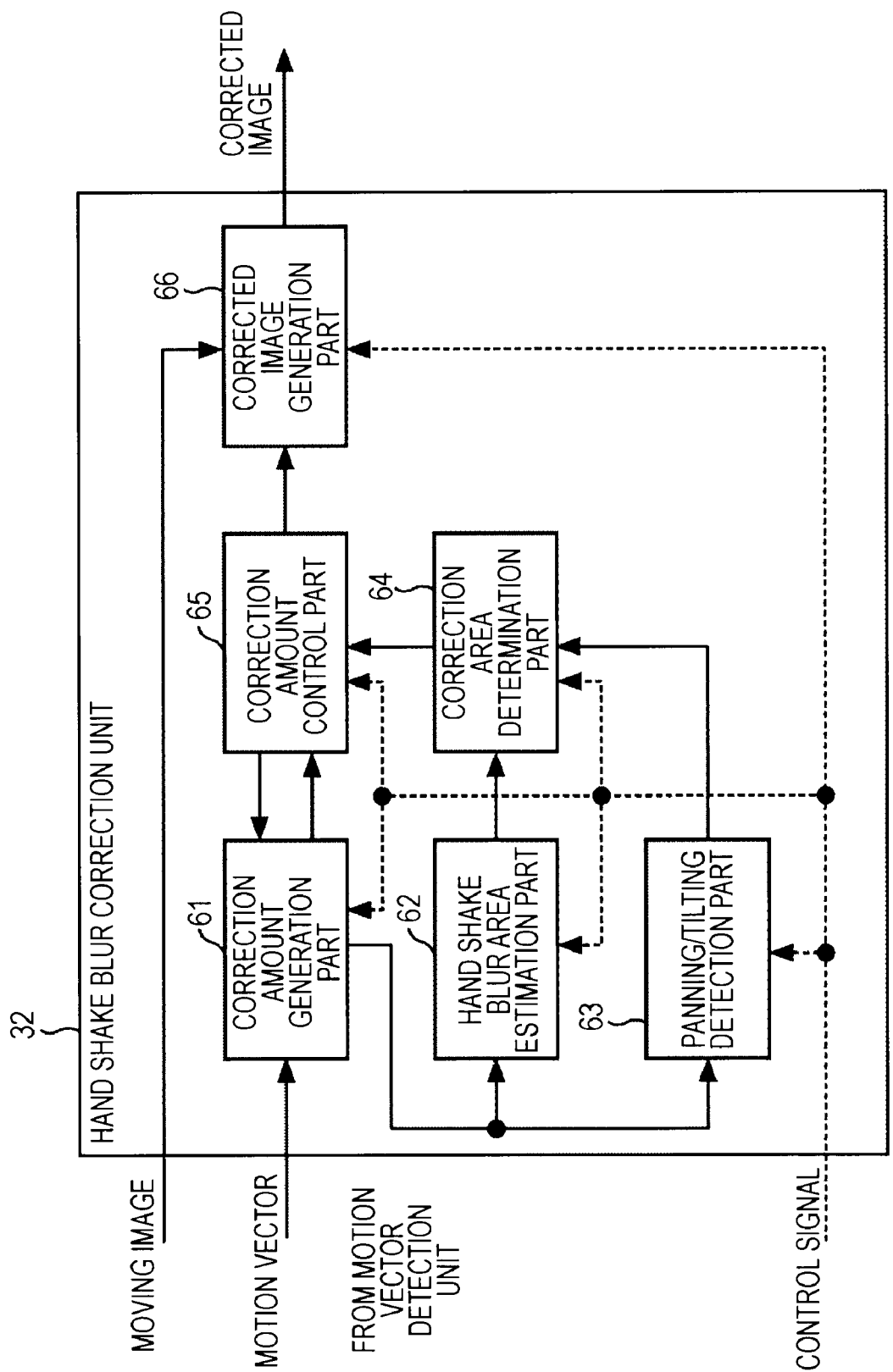
FIG. 5 is a block diagram showing an example of the detailed configuration of a hand shake blur correction unit shown in FIG. 1.

FIG. 5 is a block diagram showing an example of the detailed configuration of the hand shake blur correction unit 32 shown in FIG. 1.

The hand shake blur correction unit 32 includes a correction amount generation part 61, a hand shake blur area estimation part 62, a panning/tilting detection part 63, a correction area determination part 64, a correction amount control part 65, and a corrected image generation part 66.

Motion vectors for individual frames constituting a moving image are supplied from the motion vector detection unit 31 shown in FIG. 1 to the correction amount generation part 61.

The correction amount generation part 61 sets a specific frame among a plurality of frames as a reference frame, which is used as a reference of a hand shake blur correction process.

The correction amount generation part 61 generates, on the basis of motion vectors for individual frames supplied from the motion vector detection unit 31, a motion vector representing the motion of a frame n relative to the reference frame (frame 0) as a correction amount by which position displacement (image blur, hand shake blur, or the like) of the frame n relative to the reference frame (hereinafter, referred to as a correction amount for the frame n) is to be corrected.

That is, for example, when a motion vector for a frame n relative to a frame n−1 (hereinafter, referred to as a motion vector for the frame n) is supplied from the motion vector detection unit 31, the correction amount generation part 61 adds the motion vector for the frame n to a correction amount for the frame n−1 stored in an internal memory. Then, the correction amount generation part 61 sets the result of the addition as a correction amount for the frame n.

Note that the correction amount generation part 61 includes the internal memory, such as a flash memory, for temporarily storing information. The correction amount for the frame n−1, which has been previously generated, is stored in the memory.

The correction amount generation part 61 supplies the correction amount for the frame n generated on the basis of motion vectors for individual frames supplied from the motion vector detection unit 31, to the hand shake blur area estimation part 62, the panning/tilting detection part 63, and the correction amount control part 65.

The correction amount generation part 61 also supplies the motion vector for the frame n to the correction amount control part 65.

Furthermore, in response to feedback of an actual correction amount by which hand shake blur in the frame n is to be corrected (an actual correction amount for the frame n) from the correction amount control part 65, the correction amount generation part 61 designates, as a new designated position, the end point of the actual correction amount for the frame n starting at the designated position 41, and sets the frame n as a new reference frame.

The hand shake blur area estimation part 62 estimates a hand shake blur area, which represents an area where hand shake blur relative to a reference frame has occurred, on the basis of a correction amount for a frame n−1 stored in an internal memory (not illustrated) and a correction amount for a frame n supplied from the correction amount generation part 61, and supplies information on the estimated hand shake blur area to the correction area determination part 64.

That is, for example, the hand shake blur area estimation part 62 determines whether or not each of a horizontal component (absolute value) and a vertical component (absolute value) of the correction amount for the frame n supplied from the correction amount generation part 61 is smaller than a corresponding component (absolute value) of the correction amount for the frame n−1 stored in the internal memory. Only in a case where it is determined that at least one of the horizontal component and the vertical component of the correction amount for the frame n is smaller than the corresponding component of the correction amount for the frame n−1, the hand shake blur area estimation part 62 estimates a hand shake blur area on the basis of the correction amount for the frame n−1, and supplies information on the estimated hand shake blur area to the correction area determination part 64.

Note that the hand shake blur area estimation part 62 includes the internal memory, such as a flash memory, for temporarily storing information. The correction amount for the frame n−1, which has been previously supplied from the correction amount generation part 61, is stored in the memory.

In addition, only in a case where it is determined that at least one of the horizontal component and the vertical component of the correction amount for the frame n is smaller than the corresponding component of the correction amount for the frame n−1, the hand shake blur area estimation part 62 supplies, to the correction area determination part 64, component information indicating the component of the correction amount for the frame n−1 that is greater than the corresponding component of the correction amount for the frame n.

The panning/tilting detection part 63 detects, on the basis of the correction amount for the frame n supplied from the correction amount generation part 61, occurrence of an intentional picture composition changing operation (that is, panning, tilting, or the like) at the time of capturing the frame n. Then, the panning/tilting detection part 63 supplies the result of the detection to the correction area determination part 64.

The correction area determination part 64 updates a set correction area to an area where hand shake blur in the frame n relative to the reference frame is to be corrected on the basis of the hand shake blur area and the component information supplied from the hand shake blur area estimation part 62 and the result of the detection supplied from the panning/tilting detection part 63. Then, the correction area determination part 64 supplies information on the updated correction area to the correction amount control part 65.

Note that, for a correction area, for example, the size of a hand shake blur area determined on the basis of an assumption regarding hand shake of general users occurring at the time of capturing an image is set in advance as an initial value.

The correction amount control part 65 limits the correction amount for the frame n supplied from the correction amount generation part 61 to an actual correction amount by which hand shake blur in the frame n relative to the reference frame is to be corrected (hereinafter, referred to as the actual correction amount for the frame n), on the basis of the correction area for the frame n supplied from the correction area determination part 64. Then, the correction amount control part 65 supplies the limited correction amount to the corrected image generation part 66.

That is, for example, the correction amount control part 65 adds an actual correction amount for the frame n−1 that has been previously acquired and stored in an internal memory to the motion vector for the frame n supplied from the correction amount generation part 61, and acquires the result of the addition as a correction amount candidate for the frame n.

Note that the correction amount control part 65 includes the internal memory, such as a flash memory, for temporarily storing information. The actual correction amount for the frame n−1, which has been previously acquired, is stored in the memory.

Then, the correction amount control part 65 determines the actual correction amount for the frame n on the basis of the correction amount candidate for the frame n, the correction amount for the frame n supplied from the correction amount generation part 61, and the correction area for the frame n supplied from the correction area determination part 64. Then, the correction amount control part 65 supplies the determined actual correction amount for the frame n to the corrected image generation part 66.

The corrected image generation part 66 generates, from the supplied frame n, a corrected image where hand shake blur in the frame n has been corrected on the basis of the actual correction amount for the frame n supplied from the correction amount control part 65. Then, the corrected image generation part 66 outputs the generated corrected image.

Figure 6:
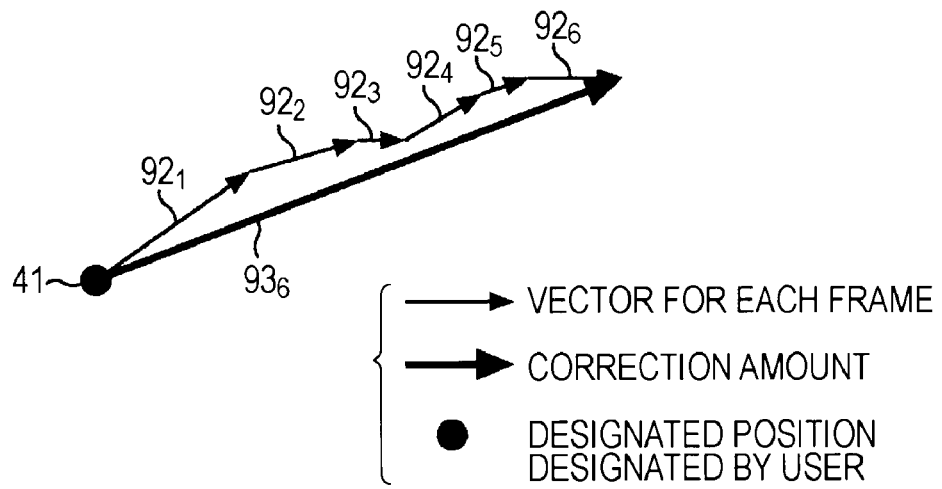
FIG. 6 is an explanatory diagram for explaining a generation method for generating a correction amount.

FIG. 6 is an explanatory diagram for explaining a generation method for generating, by the correction amount generation part 61 shown in FIG. 5, a correction amount for a frame n.

Referring to FIG. 6, the designated position 41 is designated by the user. For example, the designated position 41 is set in advance at a central position representing the center of a frame.

In addition, referring to FIG. 6, arrows $92_1$ to $92_6$ represent motion vectors for frames 1 to 6. An arrow $93_6$ represents a correction amount for the frame 6.

For example, when the motion vector $92_1$ for the frame 1 is supplied from the motion vector detection unit 31, the correction amount generation part 61 sets the motion vector $92_1$ for the frame 1 as a correction amount $93_1$ for the frame 1.

In addition, when the motion vector $92_2$ for the frame 2 is supplied from the motion vector detection unit 31, the correction amount generation part 61 adds the motion vector $92_2$ for the frame 2 to the correction amount $93_1$ for the frame 1 (that is, the motion vector $92_1$ for the frame 1) stored in the internal memory, and sets the result of the addition as a correction amount $93_2$ for the frame 2.

Similarly, when the motion vector $92_6$ for the frame 6 is supplied from the motion vector detection unit 31, the correction amount generation part 61 adds the motion vector $92_6$ for the frame 6 to a correction amount $93_5$ for the frame 5 (that is, the result of addition of the motion vectors $92_1$ to $92_5$) stored in the internal memory, and sets the result of the addition as the correction amount $93_6$ for the frame 6.

Note that, in the description below, a motion vector $92_n$ for a frame n represents a motion vector for the frame n and a correction amount $93_n$ for the frame n represents a correction amount for the frame n.

Figure 7:
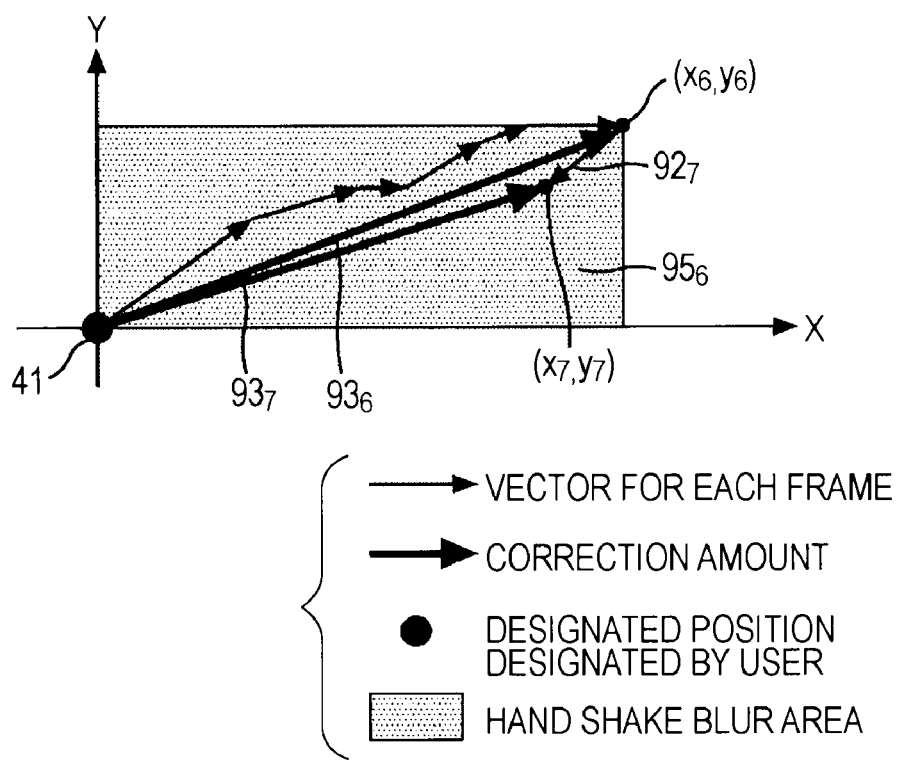
FIG. 7 is an explanatory diagram for explaining an estimation method for estimating a hand shake blur area.

FIG. 7 is an explanatory diagram for explaining an estimation method for estimating, by the hand shake blur area estimation part 62 shown in FIG. 5, a hand shake blur area where hand shake blur relative to a reference frame has occurred.

The X and Y coordinates of FIG. 7 represent orthogonal coordinates defined by X and Y axes that are mutually orthogonal to each other based on the designated position 41 as the origin. The X axis represents a horizontal component of a correction amount, and the Y axis represents a vertical component of the correction amount. Hereinafter, the same is applied to other drawings.

The hand shake blur area estimation part 62 determines whether or not a horizontal component (absolute value) of the correction amount $93_n$ for the frame n supplied from the correction amount generation part 61 is smaller than a horizontal component (absolute value) of a correction amount $93_{n-1}$ for a frame n-1 that has been previously supplied from the correction amount generation part 61.

Similarly, the hand shake blur area estimation part 62 also determines whether or not a vertical component (absolute value) of the correction amount $93_n$ for the frame n supplied from the correction amount generation part 61 is smaller than a vertical component (absolute value) of the correction amount $93_{n-1}$ for the frame n-1 that has been previously supplied from the correction amount generation part 61.

Only in a case where it is determined that at least one of the horizontal component and the vertical component of the correction amount $93_n$ for the frame n is smaller than the corresponding component of the correction amount $93_{n-1}$ for the frame n-1, the hand shake blur area estimation part 62 estimates, as a hand shake blur area, a rectangular area having, as the diagonal thereof, a line segment extending from the designated position 41 to the end point of the correction amount $93_{n-1}$ for the frame n-1 starting at the designated position 41. Then, the hand shake blur area estimation part 62 supplies information on the estimated hand shake blur area to the correction area determination part 64.

In addition, only in a case where it is determined that at least one of the horizontal component and the vertical component of the correction amount $93_n$ for the frame n is smaller than the corresponding component of the correction amount $93_{n-1}$ for the frame n-1, the hand shake blur area estimation part 62 supplies, to the correction area determination part 64, component information indicating the component of the correction amount $93_{n-1}$ for the frame n-1 that is greater than the corresponding component of the correction amount $93_n$ for the frame n.

That is, for example, as shown in FIG. 7, in a case where a horizontal component $x_7$ of a correction amount $93_7$ for a frame 7 is smaller than a horizontal component $x_6$ of the correction amount $93_6$ for the frame 6 and a vertical component $y_7$ of the correction amount $93_7$ for the frame 7 is smaller than a vertical component $y_6$ of the correction amount $93_6$ for the frame 6, the hand shake blur area estimation part 62 supplies, to the correction area determination part 64, as a hand shake blur area $95_6$, a rectangular area having, as the diagonal thereof, a line segment extending from the designated position 41 to the end point of the correction amount $93_6$ for the frame 6 starting at the designated position 41. The hand shake blur area estimation part 62 also supplies, to the correction area determination part 64, the horizontal component $x_6$ and the vertical component $y_6$ of the correction amount $93_6$ for the frame 6 as component information.

Figure 8:
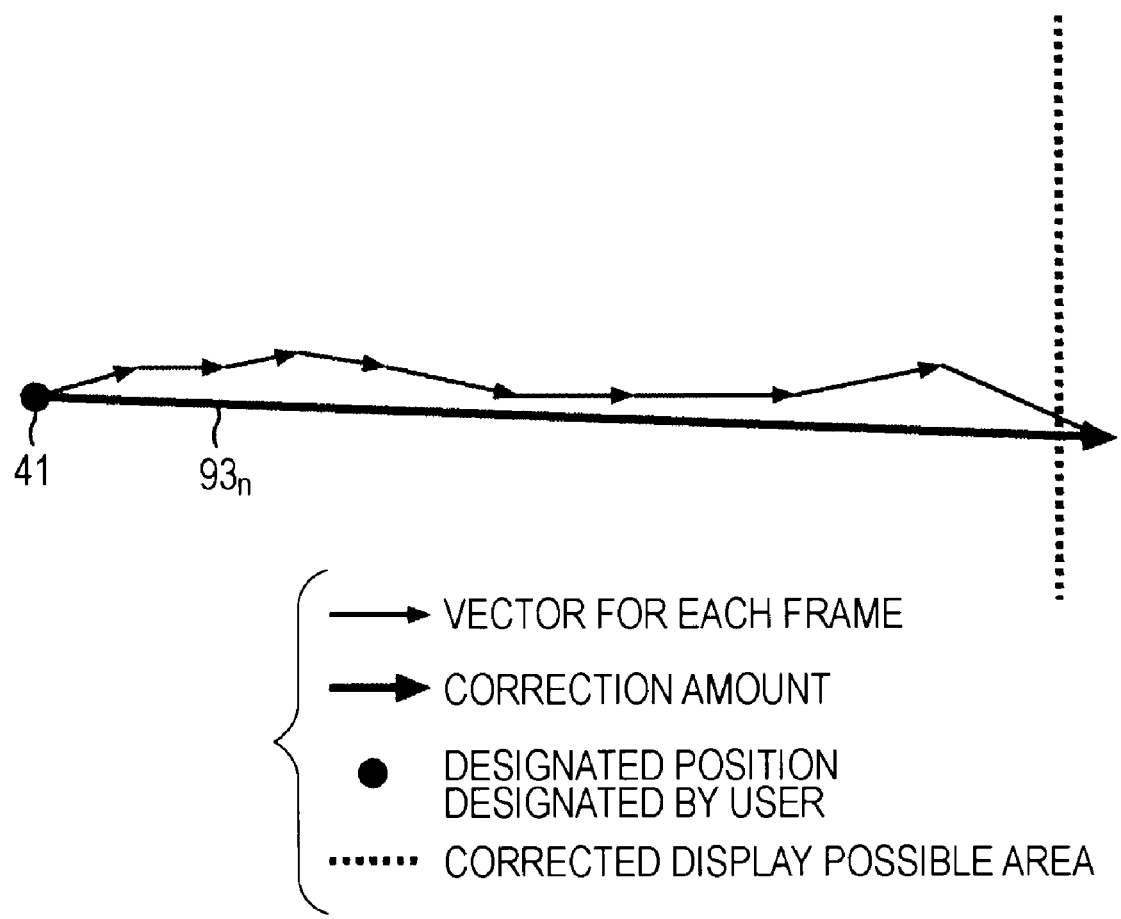
FIG. 8 is an explanatory diagram for explaining a detection method for detecting an intentional picture composition changing operation.

FIG. 8 is an explanatory diagram for explaining a panning/tilting detection method for detecting, by the panning/tilting detection part 63 shown in FIG. 5, occurrence of an intentional picture composition changing operation (that is, panning, tilting, or the like) at the time of capturing a frame n.

A broken line extending in the vertical direction in a right side portion of FIG. 8 represents a boundary line of the corrected display possible area L. An area on the left side with respect to the boundary line and including the boundary line represents a region within the corrected display possible area L. An area on the right side with respect to the boundary line represents a region outside the corrected display possible area L.

Note that, in the drawings referred to in the description below, for a motion vector $92_n$ for a frame n, a sign will be omitted in an appropriate manner, for simplification.

In response to supply of the correction amount $93_n$ for the frame n from the correction amount generation part 61, the panning/tilting detection part 63 determines whether or not the end point of the correction amount $93_n$ for the frame n starting at the designated position 41 (hereinafter, referred to as the end point of the correction amount $93_n$ for the frame n) exists within the corrected display possible area L. Then, on the basis of the result of the determination, the panning/tilting detection part 63 determines whether or not an intentional picture composition changing operation was performed at the time of capturing the frame n.

Specifically, for example, as shown in FIG. 8, in a case where the end point of the correction amount $93_n$ for the frame n exists outside the corrected display possible area L, the panning/tilting detection part 63 determines that an intentional picture composition changing operation was performed at the time of capturing the frame n. Then, the panning/tilting detection part 63 supplies the result of the determination to the correction area determination part 64.

Meanwhile, in a case where it is determined that the end point of the correction amount $93_n$ for the frame n exists within the corrected display possible area L, the panning/tilting detection part 63 determines that an intentional picture composition changing operation was not performed at the time of capturing the frame n. Then, the panning/tilting detection part 63 supplies the result of the determination to the correction area determination part 64.

An updating method for updating, by the correction area determination part 64 shown in FIG. 5, a correction area for a frame n will be described with reference to FIGS. 9 to 13.

Figure 9:
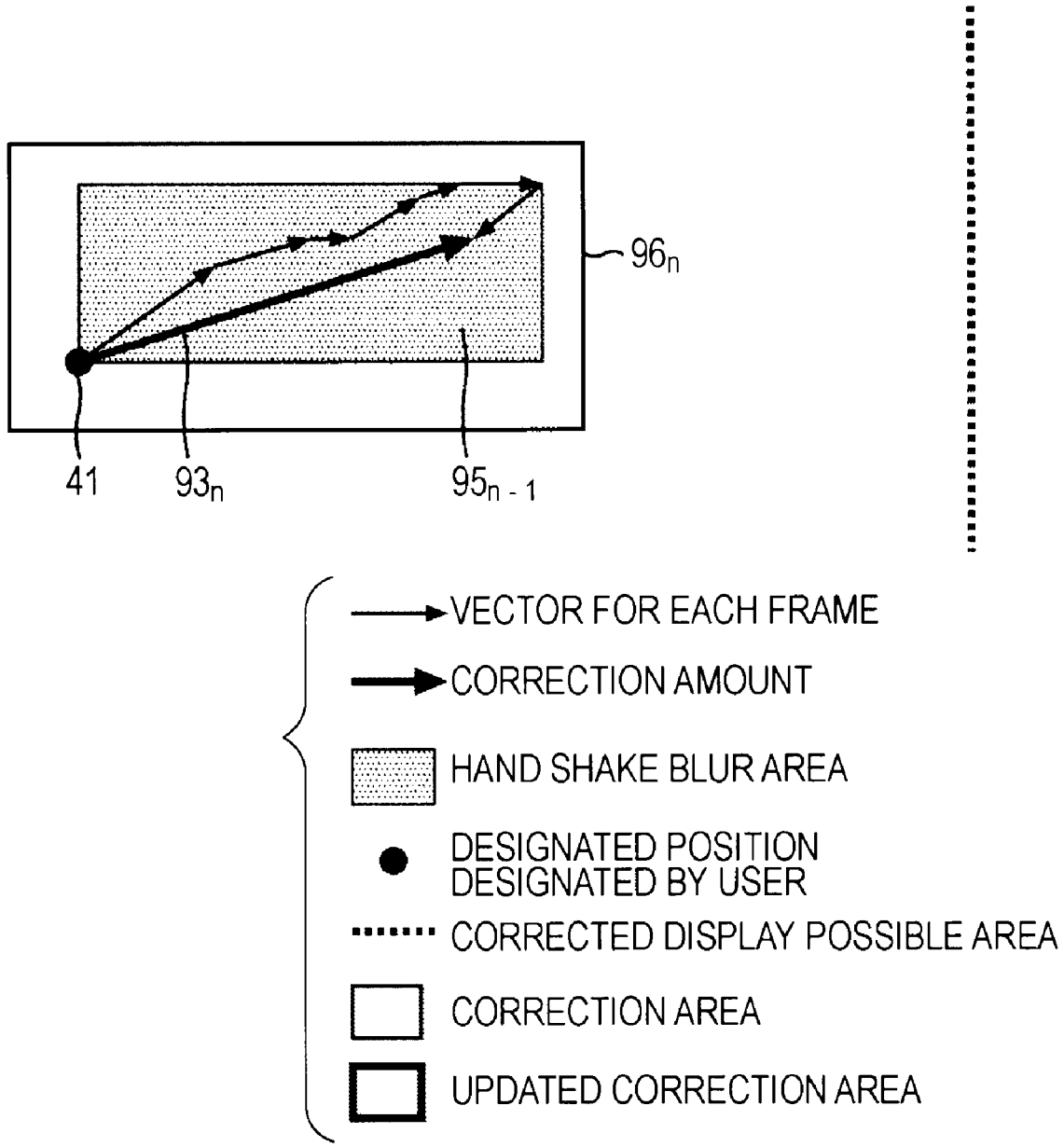
FIG. 9 is a first diagram for explaining a determination method for determining a correction area.

For example, as shown in FIG. 9, in a case where a hand shake blur area $95_{n-1}$ supplied from the hand shake blur area estimation part 62 falls within a correction area $96_n$ for the frame n and the entire hand shake blur area $95_{n-1}$ is included within the correction area $96_n$, the correction area determination part 64 does not update the correction area $96_n$ for the frame n.

Figure 10:
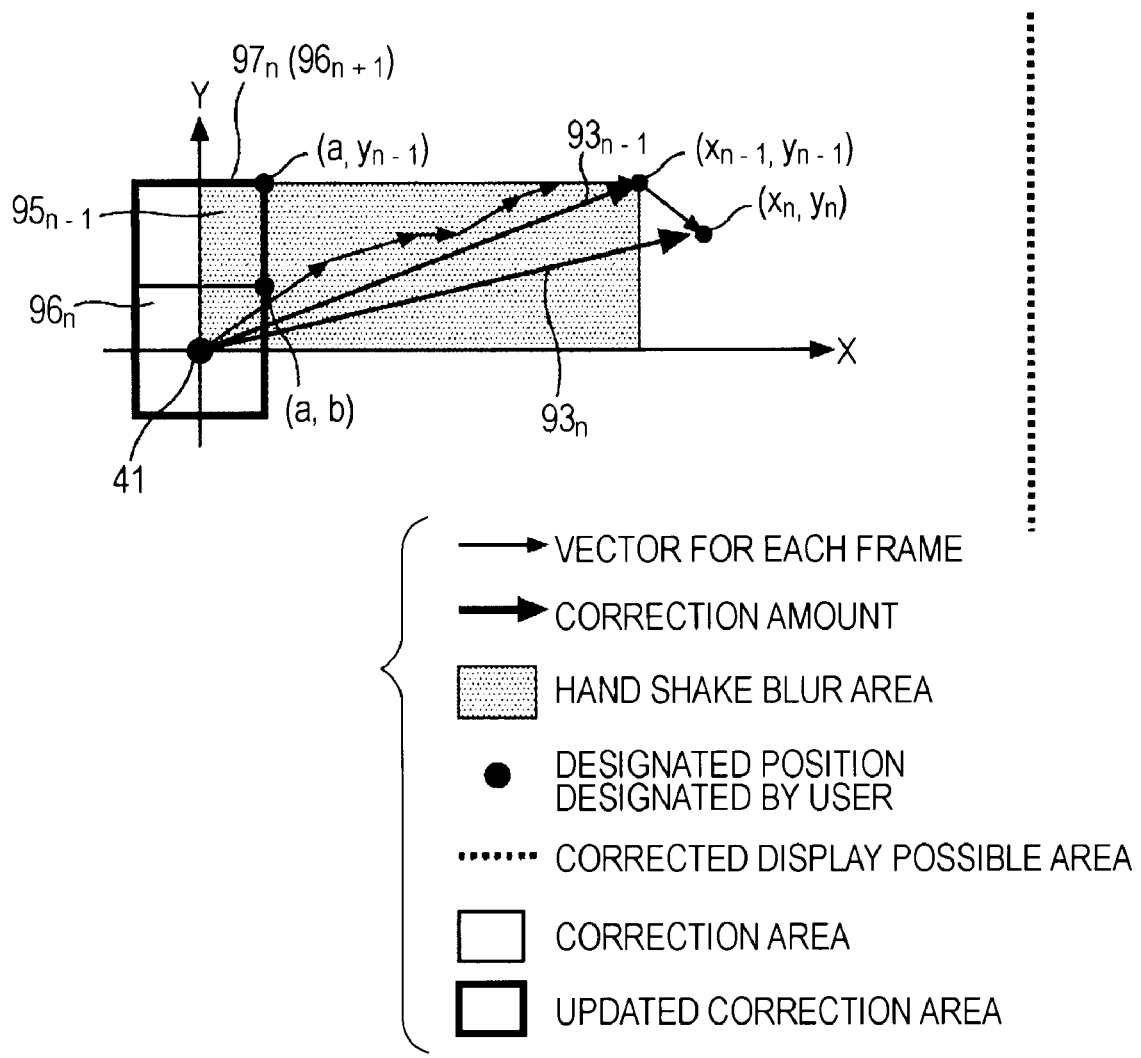
FIG. 10 is a second diagram for explaining the determination method for determining the correction area.
Figure 11:
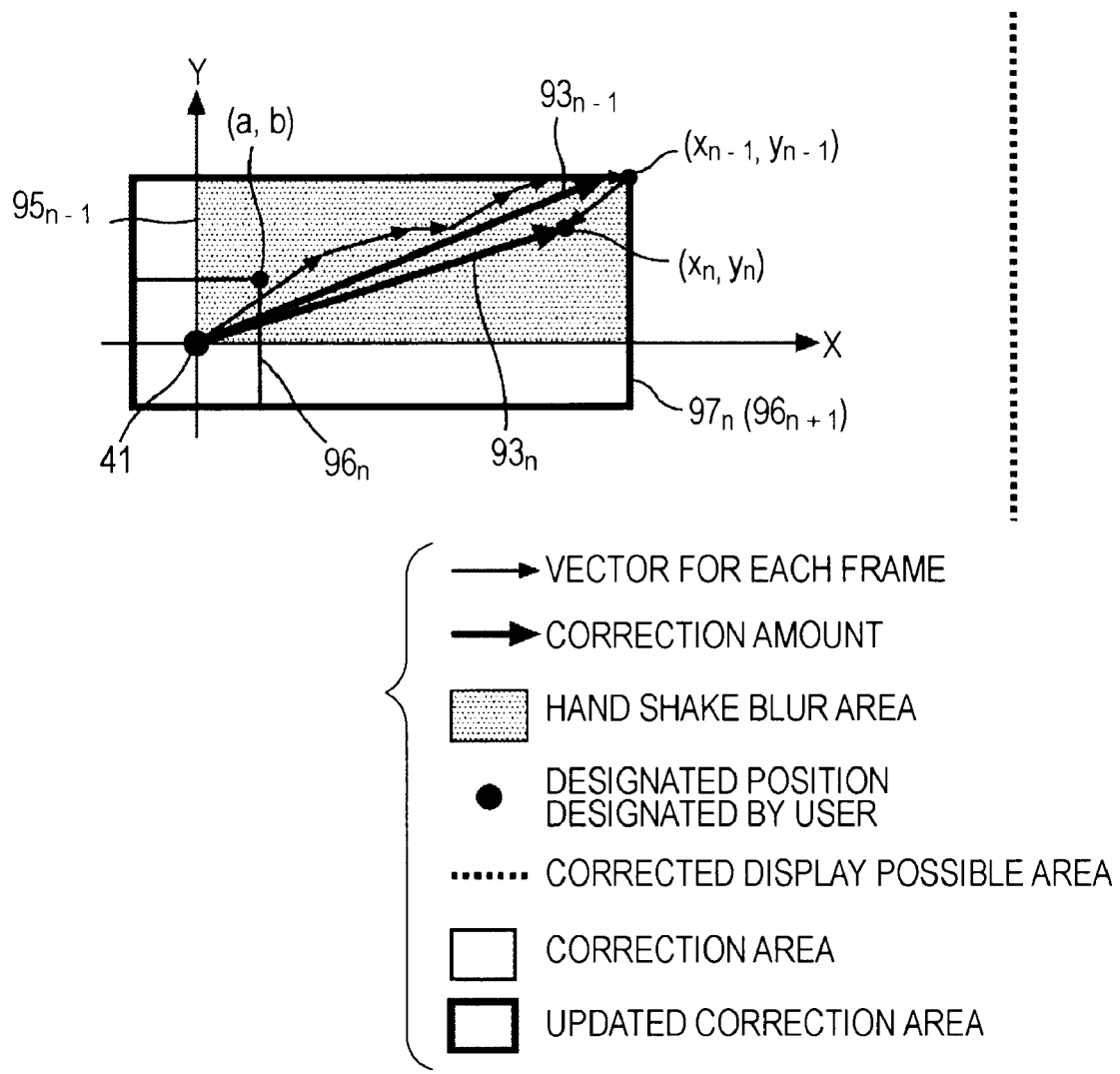
FIG. 11 is a third diagram for explaining the determination method for determining the correction area.

Meanwhile, for example, as shown in FIGS. 10 and 11, in a case where the hand shake blur area $95_{n-1}$ supplied from the hand shake blur area estimation part 62 does not fall within the correction area $96_n$ for the frame n and the entire hand shake blur area $95_{n-1}$ is not included within the correction area $96_n$, the correction area determination part 64 updates the correction area $96_n$ for the frame n on the basis of component information supplied from the hand shake blur area estimation part 62.

In the case of FIG. 10, since a vertical component $y_n$ of the correction amount $93_n$ for the frame n is smaller than a vertical component $y_{n-1}$ of the correction amount $93_{n-1}$ for the frame n−1, the vertical component $y_{n-1}$ of the correction amount $93_{n-1}$ for the frame n−1 is supplied as component information from the hand shake blur area estimation part 62 to the correction area determination part 64.

In accordance with the vertical component $y_{n-1}$ supplied from the hand shake blur area estimation part 62, the correction area determination part 64 updates the correction area $96_n$ to be enlarged in the vertical direction (Y-axis direction). That is, for example, the correction area determination part 64 updates the correction area $96_n$ to a new correction area $97_n$ (that is, a correction area $96_{n+1}$ for a frame n+1) in such a manner that the Y coordinate b at the upper-right vertex (a,b) of the correction area $96_n$ matches the Y coordinate $y_{n-1}$ at the upper-right vertex $(x_{n-1}, y_{n-1})$ of the hand shake blur area $95_{n-1}$.

In the case of FIG. 11, since the horizontal component $x_n$ and the vertical component $y_n$ of the correction amount $93_n$ for the frame n are smaller than the horizontal component $x_{n-1}$ and the vertical component $y_{n-1}$ of the correction amount $93_{n-1}$ for the frame n−1, the horizontal component $x_{n-1}$ and the vertical component $y_{n-1}$ of the correction amount $93_{n-1}$ for the frame n−1 are supplied as component information from the hand shake blur area estimation part 62 to the correction area determination part 64.

In accordance with the horizontal component $x_{n-1}$ and the vertical component $y_{n-1}$ supplied from the hand shake blur area estimation part 62, the correction area determination part 64 updates the correction area $96_n$ to be enlarged in the horizontal direction (X-axis direction) and the vertical direction. That is, for example, the correction area determination part 64 updates the correction area $96_n$ to a new correction area $97_n$ (that is, a correction area $96_{n+1}$ for a frame n+1) in such a manner that the X coordinate a and the Y coordinate b at the upper-right vertex (a,b) of the correction area $96_n$ match the X coordinate $x_{n-1}$ and the Y coordinate $Y_{n-1}$ at the upper-right vertex $(x_{n-1}, y_{n-1})$ of the hand shake blur area $95_{n-1}$.

In FIGS. 10 and 11, the correction area for the frame n is the correction area $96_n$ before being updated, and the updated correction area $97_n$ is the correction area $96_{n+1}$ for the next frame n+1.

Figure 12:
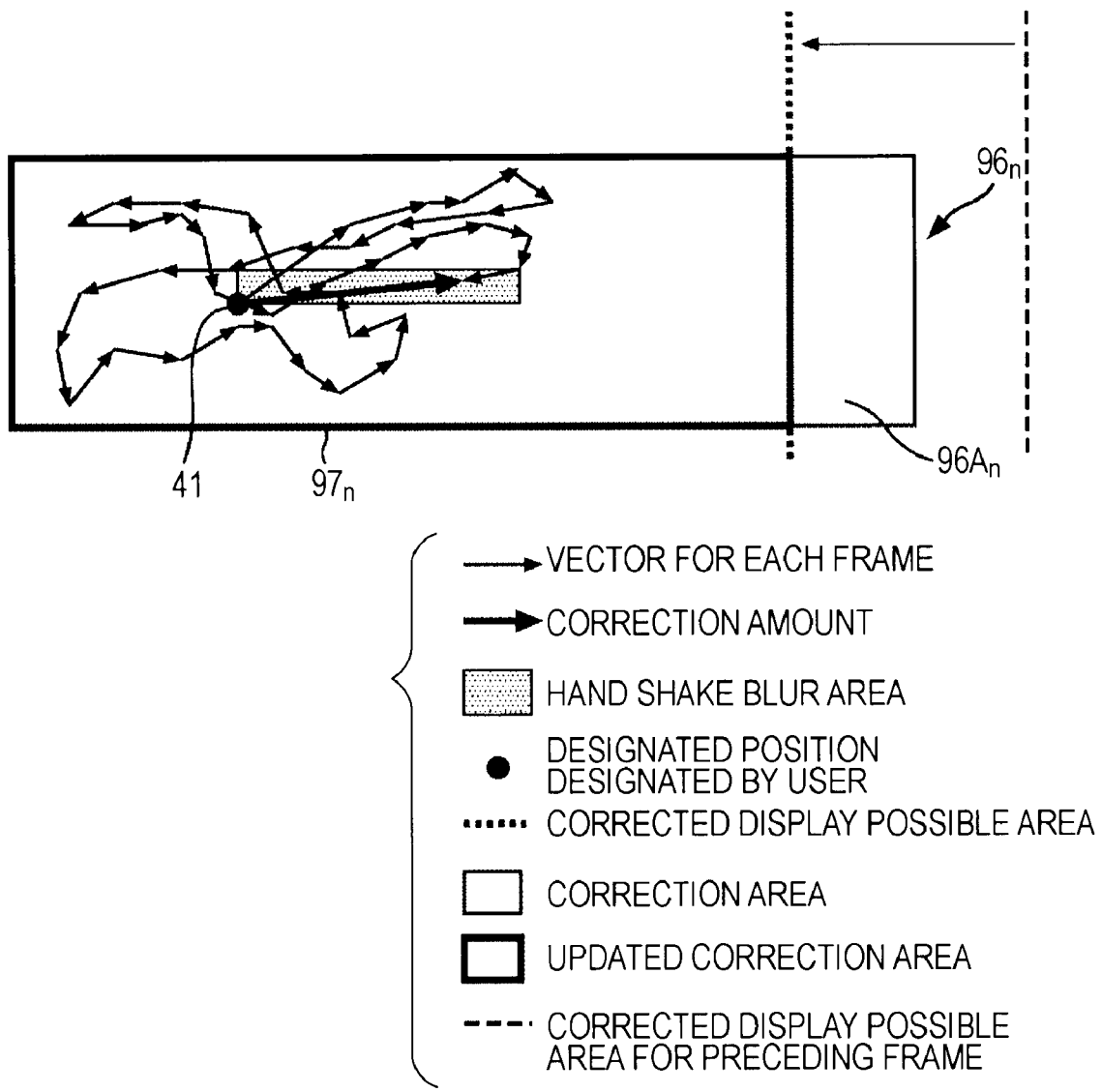
FIG. 12 is a fourth diagram for explaining the determination method for determining the correction area.

Furthermore, for example, as shown in FIG. 12, in a case where the size of the corrected display possible area L is reduced in accordance with a key operation by the user and the correction area $96_n$ for the frame n extends beyond the boundary of the corrected display possible area L by an area $96A_n$, the correction area $96_n$ for the frame n is updated to an area $97_n$ that falls within the corrected display possible area L so that the area $96A_n$, by which the correction area $96_n$ extends beyond the corrected display possible area L, is eliminated.

The corrected area $97_n$ updated in accordance with the key operation by the user is set as a new correction area $96_n$ for the frame n.

Figure 13:
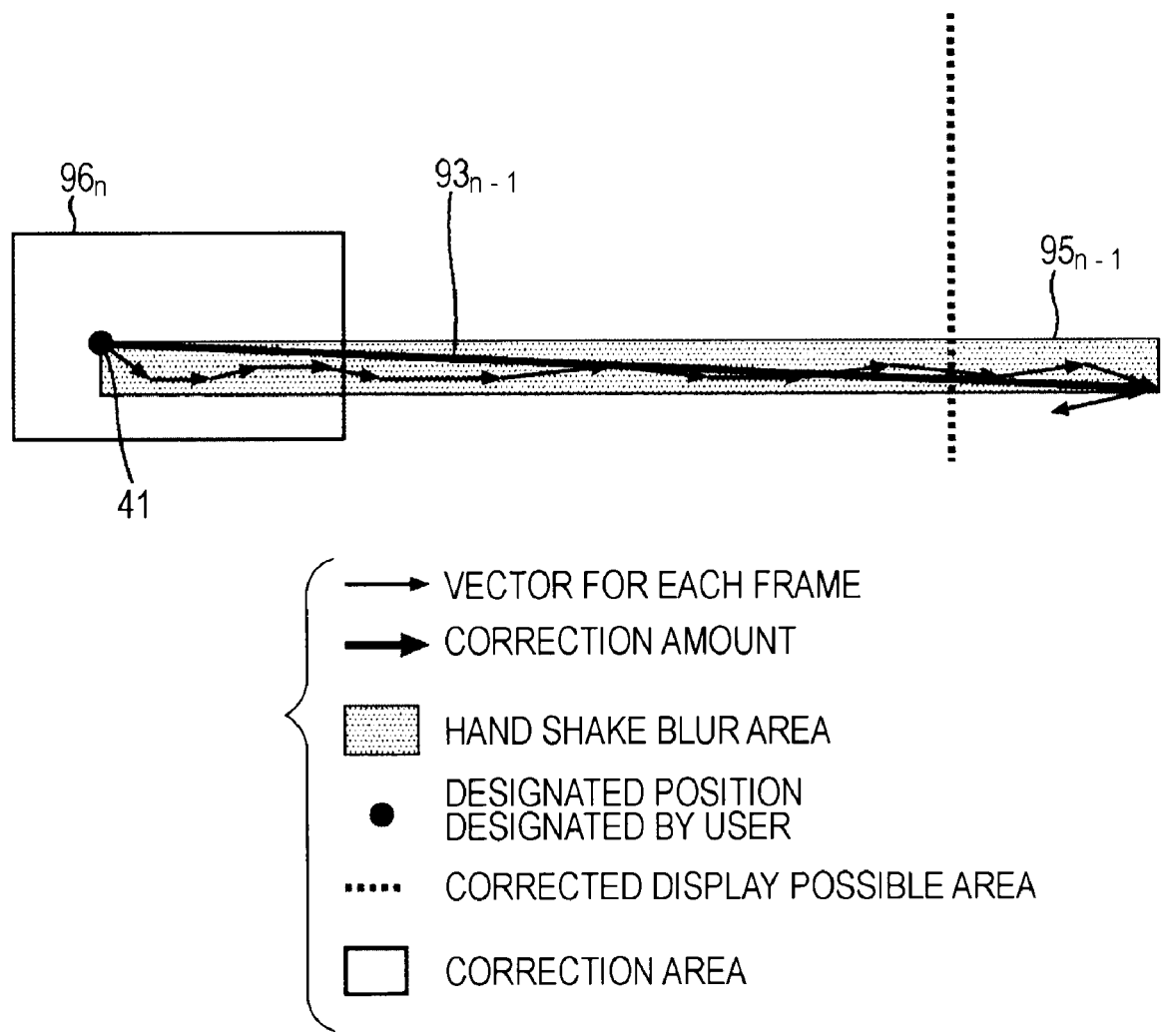
FIG. 13 is a fifth diagram for explaining the determination method for determining the correction area.

In addition, in a case where the panning/tilting detection part 63 has detected occurrence of an intentional picture composition changing operation at the time of capturing a frame n−1 corresponding to a correction amount $93_{n-1}$ used for estimation of a hand shake blur area $95_{n-1}$, that is, in a case where, for example, as shown in FIG. 13, the end point of the correction amount $93_{n-1}$ for the frame n−1 is located outside the boundary of the corrected display possible area L, the correction area determination part 64 does not update the correction area $96_n$ for the frame n even if the hand shake blur area $95_{n-1}$ supplied from the hand shake blur area estimation part 62 does not fall within the correction area $96_n$ for the frame n and the entire hand shake blur area $95_{n-1}$ is not included within the correction area $96_n$.

As described above with reference to FIGS. 9 to 13, except for a case where a correction area is updated in accordance with a key operation by a user, an updated correction area is used as a correction area for the subsequent frame.

The correction amount control part 65 adds an actual correction amount $98_{n-1}$ for a frame n−1 to a motion vector $92_n$ for a frame n supplied from the correction amount generation part 61, and acquires the result of the addition as a correction amount candidate for the frame n.

Then, the correction amount control part 65 determines an actual correction amount for the frame n on the basis of the correction amount candidate for the frame n, a correction amount $93_n$ for the frame n supplied from the correction amount generation part 61, and a correction area $96_n$ for the frame n supplied from the correction area determination part 64.

A determination method for determining, by the correction amount control part 65 shown in FIG. 5, an actual correction amount for a frame n will be described with reference to FIGS. 14 to 16.

Figure 14:
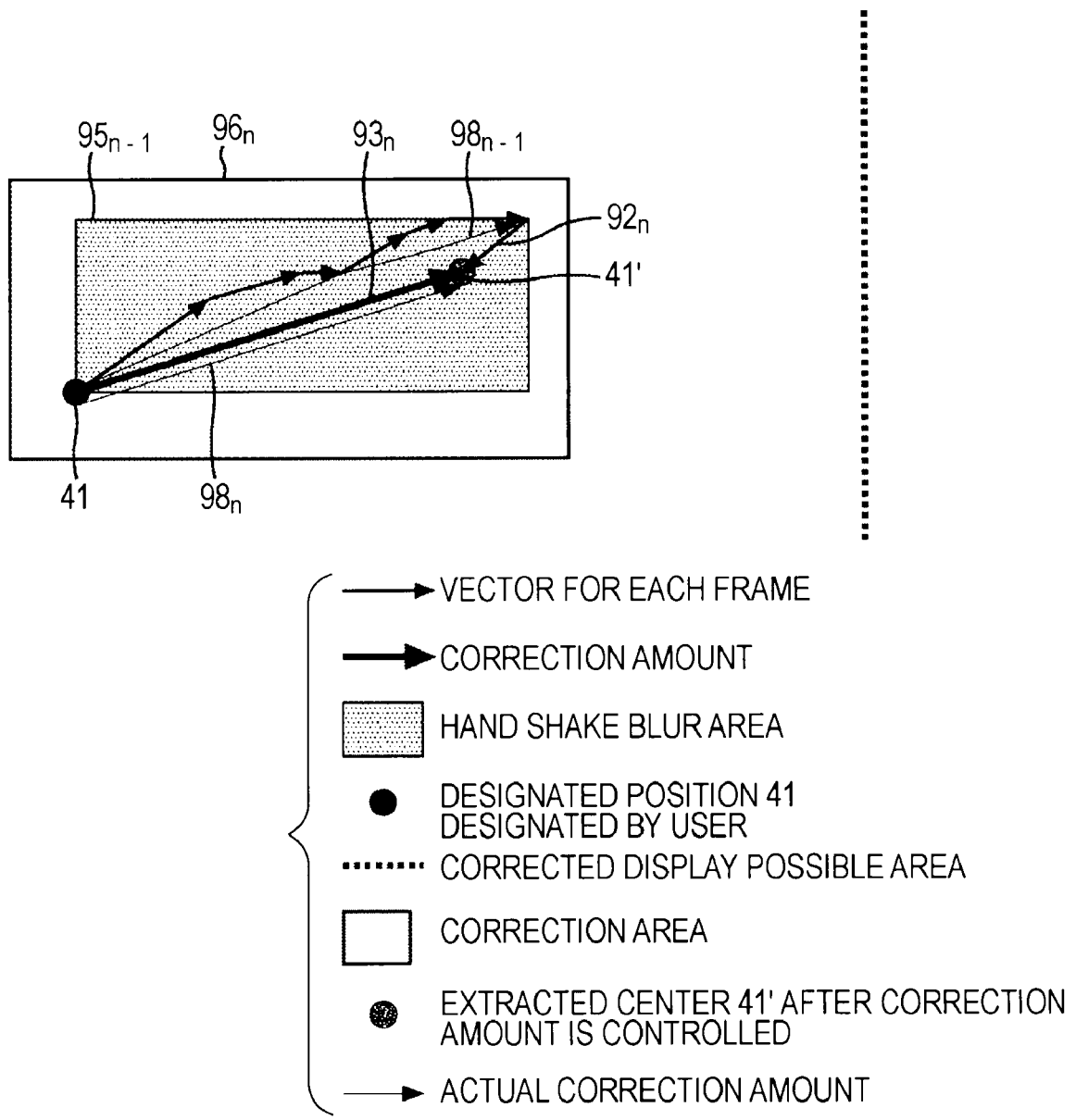
FIG. 14 is a first diagram for explaining a determination method for determining an actual correction amount.

FIG. 14 is an explanatory diagram for explaining an example of a case where a correction amount $93_n$ for a frame n is directly set as an actual correction amount $98_n$ for the frame n.

As shown in FIG. 14, in a case where the end point 41' of the correction amount $93_n$ for the frame n supplied from the correction amount generation part 61 is the same as the end point of a correction amount candidate for the frame n (hereinafter, referred to as the end point of the correction amount candidate for the frame n) starting at the designated position 41 (that is, the result of addition of an actual correction amount $98_{n-1}$ for a frame n−1 and a motion vector $92_n$ for the frame n) and the end point 41' exists within a correction area $96_n$ for the frame n supplied from the correction area determination part 64, the correction amount control part 65 supplies the correction amount $93_n$ for the frame n as an actual correction amount $98_n$ for the frame n to the corrected image generation part 66.

Figure 15:
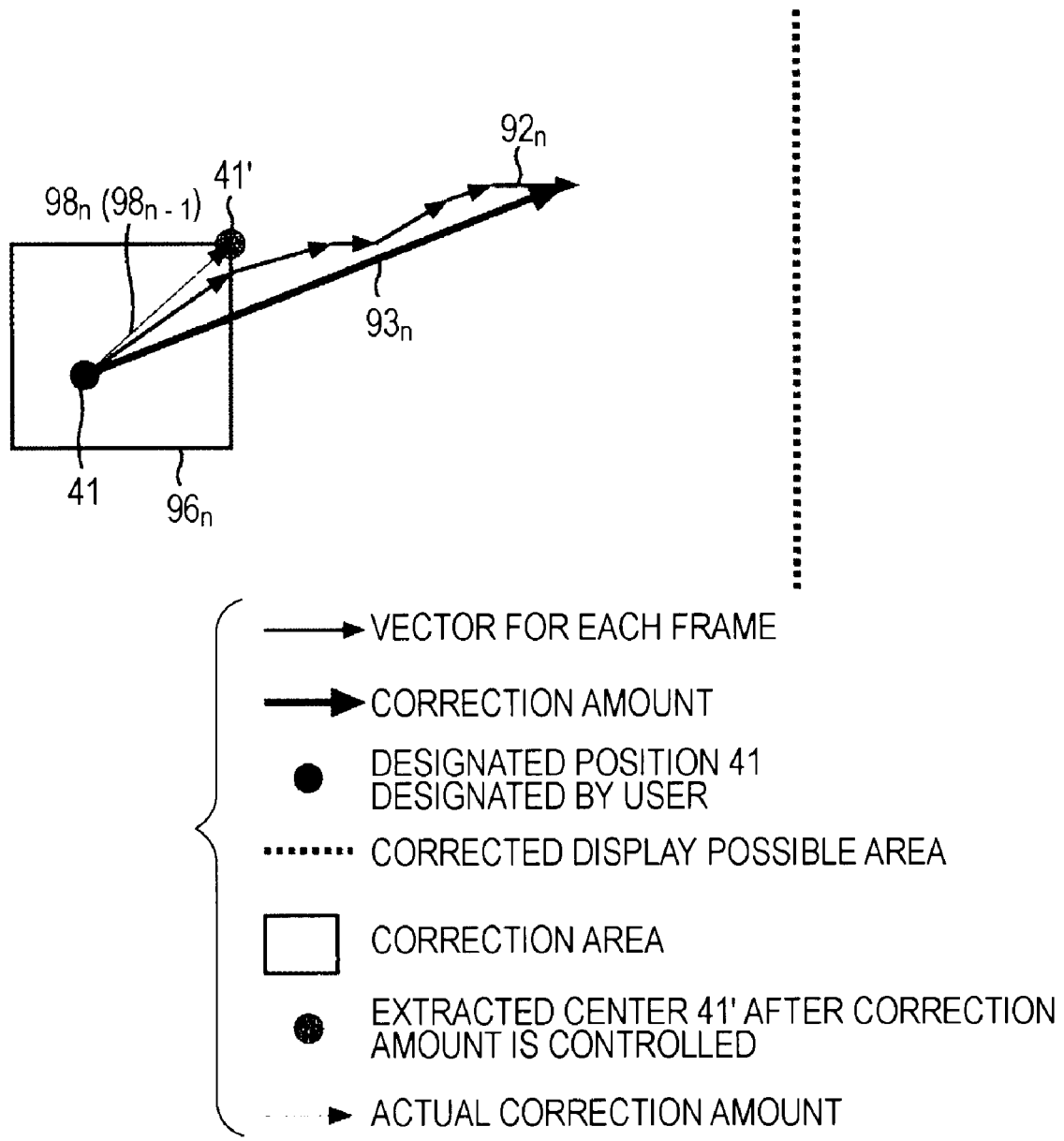
FIG. 15 is a second diagram for explaining the determination method for determining the actual correction amount.

FIG. 15 is an explanatory diagram for explaining an example of a case where the correction amount $93_n$ for the frame n is limited on the basis of the correction amount $96_n$ for the frame n and the limited correction amount for the frame n is set as the actual correction amount $98_n$ for the frame n.

As shown in FIG. 15, in a case where the end point of the correction amount candidate for the frame n (that is, the result of addition of the actual correction amount $98_{n-1}$ for the frame n−1 and the motion vector $92_n$ for the frame n) and the end point of the correction amount $93_n$ for the frame n do not exist within the correction area $96_n$ for the frame n, the end point of the correction amount $93_n$ for the frame n is limited within the correction area $96_n$ for the frame n. Then, the correction amount control part 65 supplies the limited correction amount for the frame n as the actual correction amount $98_n$ for the frame n to the corrected image generation part 66.

That is, for example, the correction amount control part 65 limits the correction amount $93_n$ for the frame n to the actual correction amount $98_n$ for the frame n starting at the designated position 41 and ending at one of the four vertices of the correction area $96_n$ for the frame n that is located nearest to the end point of the correction amount $93_n$ for the frame n.

Alternatively, for example, the correction amount control part 65 may limit the correction amount $93_n$ for the frame n to the actual correction amount $98_n$ for the frame n starting at the designated position 41 and ending at a point at which a line segment extending from the designated position 41 to the end point of the correction amount $93_n$ for the frame n intersects with the boundary line of the correction area $96_n$ for the frame n.

Note that, in a case where the correction amount control part 65 limits the correction amount $93_n$ for the frame n to the actual correction amount $98_n$ for the frame n ending at one of the four vertices of the correction area $96_n$ for the frame n, since one of the four vertices set in advance can simply be selected as an end point, the correction amount $93_n$ for the frame n can be limited to the actual correction amount $98_n$ for the frame n quickly compared with a case where the end point of the actual correction amount $98_n$ for the frame n is calculated for each frame.

Figure 16:
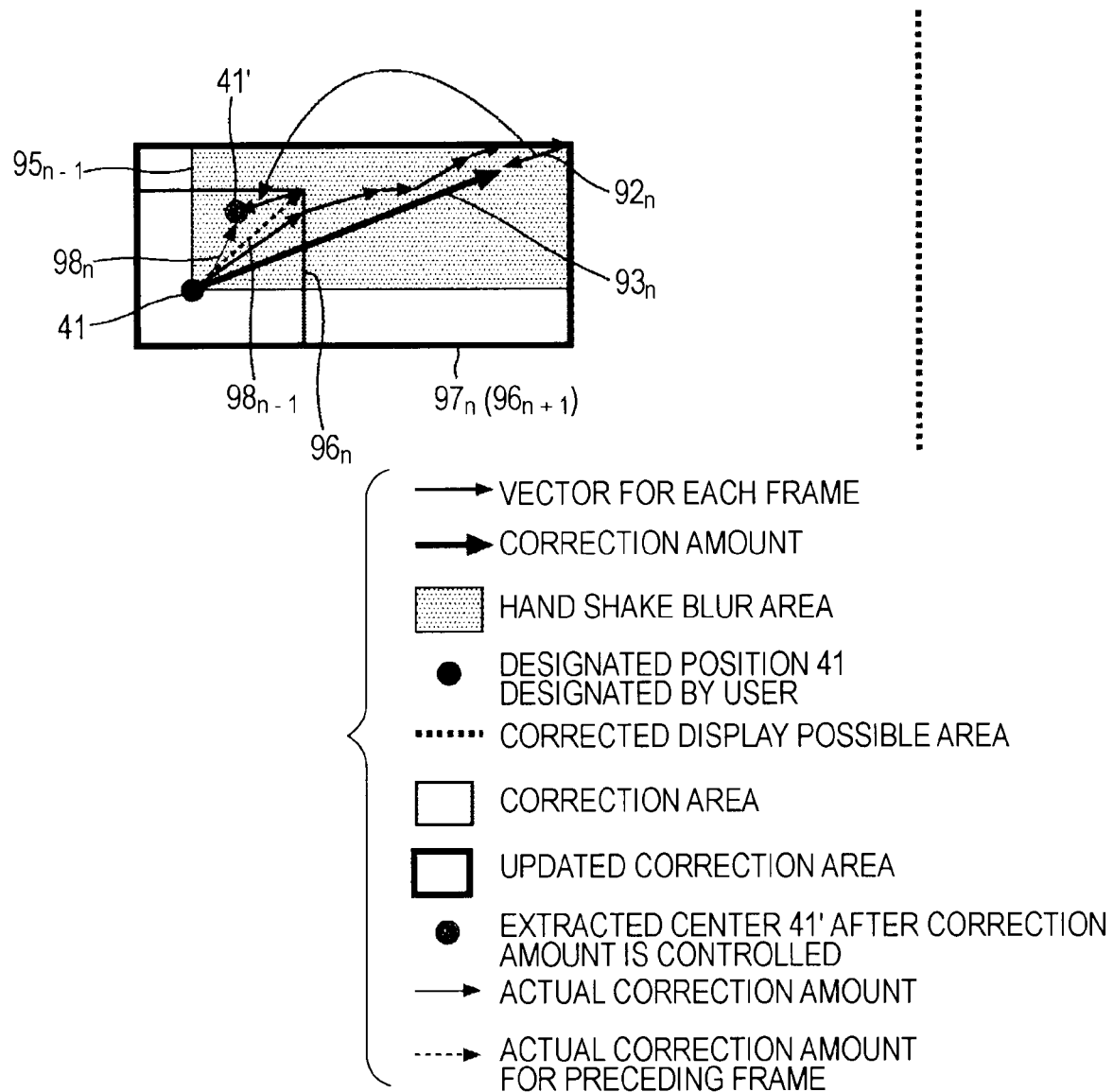
FIG. 16 is a third diagram for explaining the determination method for determining the actual correction amount.

FIG. 16 is an explanatory diagram for explaining an example of a case where a correction amount candidate for a frame n is directly set as an actual correction amount $98_n$ for the frame n. As shown in FIG. 16, in a case where the size of a correction area $96_{n+1}$ for a frame n+1 is greater than the size of a correction area $96_n$ for the frame n (that is, in a case where the correction area $96_n$ for the frame n is updated and an updated corrected area $97_n$ is set as the correction area $96_{n+1}$ for the frame n+1), the correction amount candidate for the frame n is directly set as the actual correction amount $98_n$ for the frame n.

As shown in FIG. 16, in a case where the end point 41' of the correction amount candidate for the frame n (that is, the result of addition of an actual correction amount $98_{n-1}$ for a frame n−1 and a motion vector $92_n$ for the frame n) exists within the correction area $96_n$ for the frame n and the end point 41' of the correction amount candidate for the frame n is different from the end point of the correction amount $93_n$ for the frame n, the correction amount control part 65 supplies the correction amount candidate for the frame n as the actual correction amount $98_n$ for the frame n to the correction amount generation part 61 and the corrected image generation part 66.

Note that, in response to supply of the actual correction amount $98_n$ for the frame n from the correction amount control part 65, the correction amount generation part 61 sets the end point 41' of the actual correction amount $98_n$ for the frame n as a new designated position, sets the frame n as a reference frame, and generates a correction amount for the new reference frame.

Figure 17A:
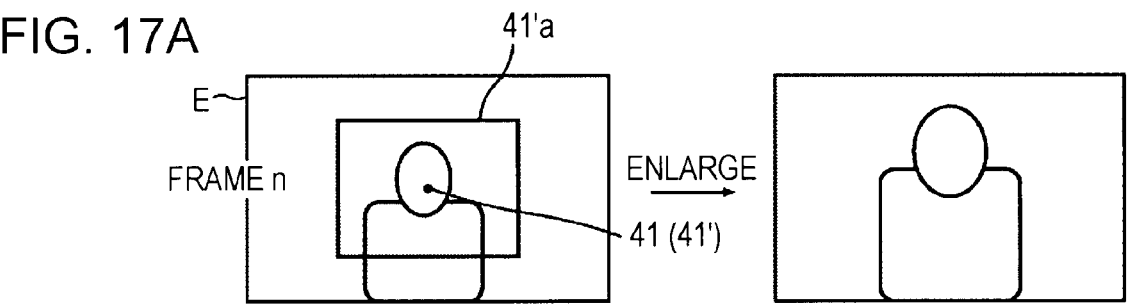
FIGS. 17A, 17B, and 17C are explanatory diagrams for explaining a generation method for generating a corrected image.
Figure 17B:
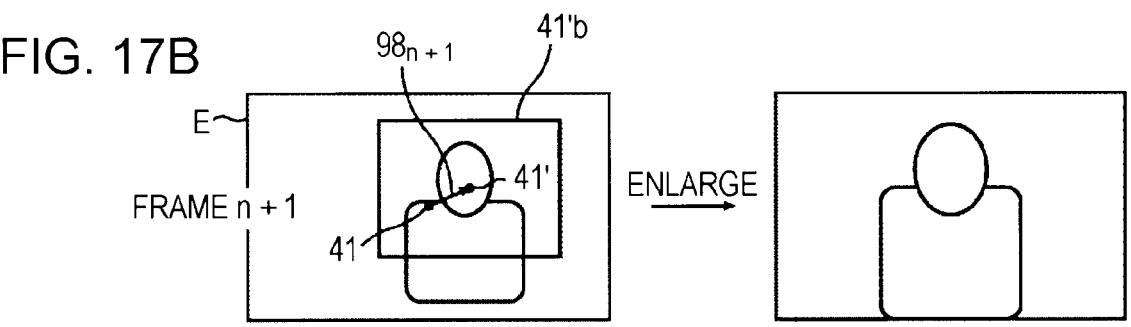
Figure 17C:
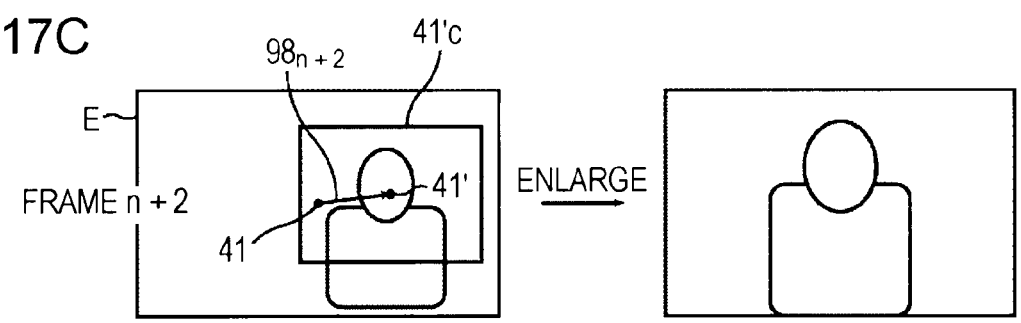

FIGS. 17A, 17B, and 17C are explanatory diagrams for explaining a generation method for generating, by the corrected image generation part 66 shown in FIG. 5, a corrected image where hand shake blur has been corrected.

For example, when a frame n is supplied, the corrected image generation part 66 moves the extracted center from the designated position 41 to the position 41' on the basis of an actual correction amount $98_n$ for the frame n supplied from the correction amount control part 65 (that is, a vector starting at the designated position 41 and ending at the position 41'), and extracts an extracted image 41'a on the basis of the extracted box e centered on the moved extracted center 41', as shown on the left-hand side of FIG. 17A.

The corrected image generation part 66 enlarges the extracted image 41'a extracted from the captured region E to a specific size to generate a corrected image, as shown on the right-hand side of FIG. 17A, and outputs the generated corrected image.

When a frame n+1 is supplied, the corrected image generation part 66 moves the extracted center from the designated position 41 to the position 41' on the basis of an actual correction amount $98_{n+1}$ for the frame n+1 supplied from the correction amount control part 65, and extracts an extracted image 41'b on the basis of the extracted box e centered on the moved extracted center 41', as shown on the left-hand side of FIG. 17B.

The corrected image generation part 66 enlarges the extracted image 41'b extracted from the captured region E to a specific size to generate a corrected image, as shown on the right-hand side of FIG. 17B, and outputs the generated corrected image.

When a frame n+2 is supplied, the corrected image generation part 66 moves the extracted center from the designated position 41 to the position 41' on the basis of an actual correction amount $98_{n+2}$ for the frame n+2 supplied from the correction amount control part 65, and extracts an extracted image 41'c on the basis of the extracted box e centered on the moved extracted center 41', as shown on the left-hand side of FIG. 17C.

The corrected image generation part 66 enlarges the extracted image 41'c extracted from the captured region E to a specific size to generate a corrected image, as shown on the right-hand side of FIG. 17C, and outputs the generated corrected image.

Figure 18A:
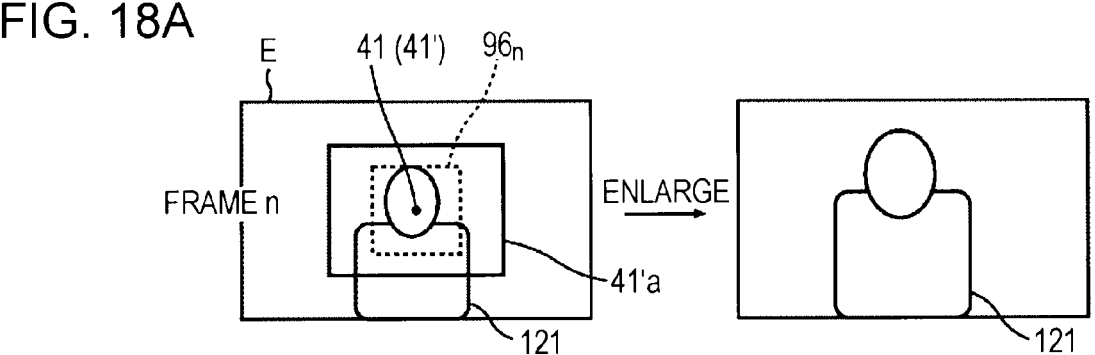
FIGS. 18A, 18B, and 18C are explanatory diagrams for explaining a feature that even in a case where the end point of a correction amount is moved outside a correction area because of hand shake of a photographer, the position of an object in a corrected image is displaced by only a negligible amount.
Figure 18B:
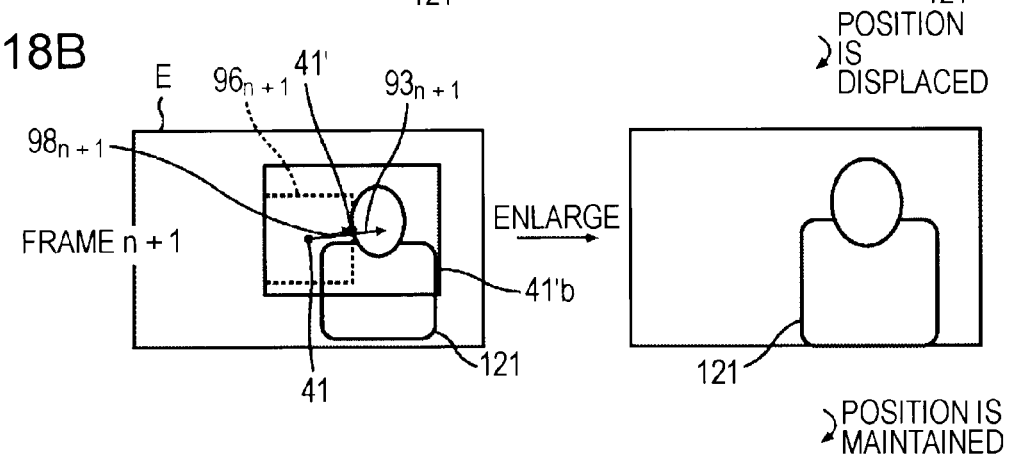
Figure 18C:
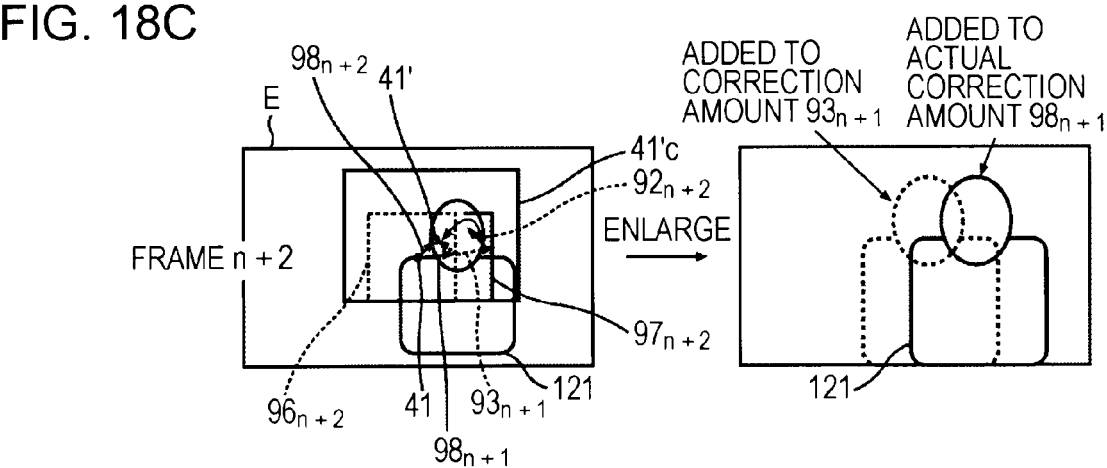

FIGS. 18A, 18B, and 18C are explanatory diagrams for explaining a feature that even in a case where the end point of a correction amount is moved outside a correction area because of hand shake of a photographer, the position of an object in a corrected image is displaced by only a negligible amount. FIGS. 18A to 18C show a hand shake blur correction process performed in a case where a camera is moved in a leftward direction during a time from a frame n to a frame n+1 due to hand shake of a photographer and the camera is moved in a lower-rightward direction during a time from the frame n+1 to a frame n+2 due to hand shake of the photographer.

In the frame n shown on the left-hand side of FIG. 18A, the end point 41' of a correction amount $93_n$ for the frame n starting at the designated position 41 (and a correction amount candidate for the frame n) exists within a correction area $96_n$. Thus, the correction amount control part 65 supplies the correction amount $93_n$ for the frame n as an actual correction amount $98_n$ for the frame n to the corrected image generation part 66.

For the frame n, the corrected image generation part 66 extracts the extracted image 41'a on the basis of the actual correction amount $98_n$ for the frame n supplied from the correction amount control part 65, and enlarges the extracted image 41'a. Accordingly, the corrected image generation part 66 generates a corrected image where an object 121 is displayed, as shown on the right-hand side of FIG. 18A, and outputs the generated corrected image.

In the frame n+1 shown on the left-hand side of FIG. 18B, the end point of a correction amount $93_{n+1}$ for the frame n+1 (and a correction amount candidate for the frame n+1) does not exist within a correction area $96_{n+1}$ for the frame n+1. Thus, the correction amount control part 65 limits the correction amount $93_{n+1}$ for the frame n+1 on the basis of the correction area $96_{n+1}$ for the frame n+1, and supplies the limited correction amount for the frame n+1 as an actual correction amount $98_{n+1}$ for the frame n+1 to the corrected image generation part 66.

For the frame n+1, the corrected image generation part 66 extracts the extracted image 41'b on the basis of the actual correction amount $98_{n+1}$ for the frame n+1 supplied from the correction amount control part 65, and enlarges the extracted image 41'b. Accordingly, the corrected image generation part 66 generates a corrected image where the object 121 is displayed, as shown on the right-hand side of FIG. 18B, and outputs the generated corrected image.

As shown on the right-hand side of FIG. 18B, in the corrected image generated for the frame n+1, the position of the object 121 in the corrected image for the frame n has been displaced by an amount corresponding to the limitation imposed on the correction amount $93_{n+1}$ for the frame n+1.

In the frame n+2 shown on the left-hand side of FIG. 18C, the end point 41' of a correction amount candidate for the frame n+2 (that is, the result of addition of the actual correction amount $98_{n+1}$ for the frame n+1 and a motion vector $92_{n+2}$ for the frame n+2) exists within a correction area $96_{n+2}$ for the frame n+2, and the end point 41' of the correction amount candidate for the frame n+2 is different from the end point of a correction amount $93_{n+2}$ for the frame n+2 (that is, the result of addition of the correction amount $93_{n+1}$ for the frame n+1 and the motion vector $92_{n+2}$ for the frame n+2). Thus, the correction amount control part 65 supplies the correction amount candidate for the frame n+2 as an actual correction amount $98_{n+2}$ for the frame n+2 to the correction amount generation part 61 and the corrected image generation part 66.

For the frame n+2, the corrected image generation part 66 extracts the extracted image 41'c on the basis of the actual correction amount $98_{n+2}$ for the frame n+2 supplied from the correction amount control part 65, and enlarges the extracted image 41'c. Accordingly, the corrected image generation part 66 generates a corrected image where the object 121 is displayed, as shown on the right-hand side of FIG. 18C, and outputs the generated corrected image.

As shown on the right-hand side of FIG. 18C, in the corrected image generated for the frame n+2, the position of the object 121 in the corrected image for the frame n+1 is maintained.

That is, for the frame n+2, in a case where the actual correction amount for the frame n+2 is determined on the basis of the result of addition of the correction amount $93_{n+1}$ for the frame n+1 and the motion vector $92_{n+2}$ for the frame n+2, that is, the correction amount $93_{n+2}$ by which position displacement of the frame n+2 relative to the reference frame, which is the same as the frame n, is to be corrected, the actual correction amount for the frame n+2 is an amount by which hand shake blur in the frame n+2 relative to the frame n is to be corrected.

As described above, in this case, the actual correction amount for the frame n+2 is not an amount by which hand shake blur in the frame n+2 relative to the frame n+1 is to be corrected. Thus, the corrected image generation part 66 generates a corrected image for the frame n+2 where the position of the object 121 in the corrected image for the frame n+1 has been displaced.

Thus, for the frame n+2, the actual correction amount $98_{n+2}$ for the frame n+2 is determined on the basis of the result of addition of the actual correction amount $98_{n+1}$ for the frame n+1 and the motion vector $92_{n+2}$ for the frame n+2, that is, a correction amount by which position displacement of the frame n+2 relative to the frame n+1 is to be corrected, as the correction amount for the frame n+2.

As described above, for the frame n+2, the result of addition of the actual correction amount $98_{n+1}$ for the frame n+1 and the motion vector $92_{n+2}$ for the frame n+2 is set as the actual correction amount $98_{n+2}$ for the frame n+2 on the basis of the correction area $96_{n+2}$ for the frame n+2. Thus, the corrected image generation part 66 generates a corrected image for the frame n+2 where the position of the object 121 in the corrected image for the frame n+1 is maintained, as shown on the right-hand side of FIG. 18C.

Note that, in response to feedback (supply) of the actual correction amount $98_{n+2}$ for the frame n+2 from the correction amount control part 65, the correction amount generation part 61 sets the end point 41' of the actual correction amount $98_{n+2}$ for the frame n+2 as a new designated position, sets the frame n+2 as a reference frame, and generates a correction amount for the new reference frame.

FIGS. 19A and 19B and FIGS. 20A and 20B are explanatory diagrams for explaining a feature that hand shake blur occurring in a frame after panning is performed can be corrected. FIGS. 19A and 19B and FIGS. 20A and 20B show captured regions E for frames n to n+3 and corrected images for the frames n to n+3 in a case where a photographer who captures an image of the object 121 in the frame n performs panning in the frames n+1 to n+3 so that an image of an object 122 positioned to the left of the object 121 when viewed from the photographer can be captured.

Figure 19A:
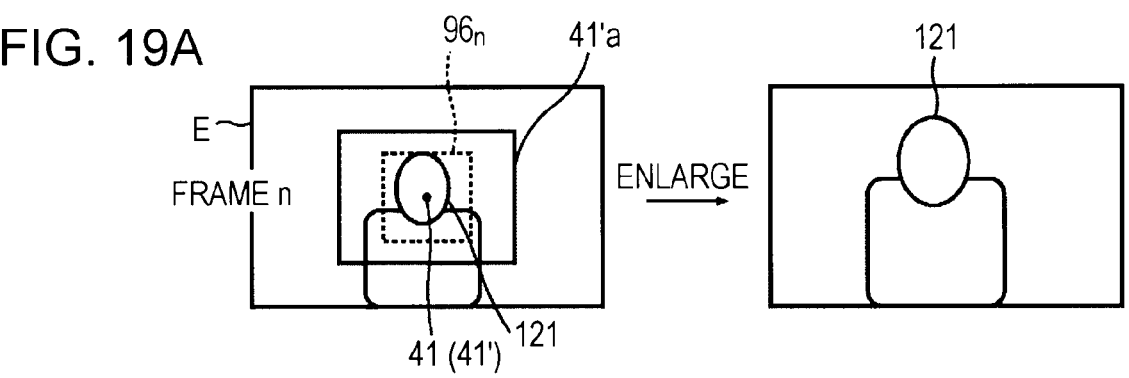
FIGS. 19A and 19B are first diagrams for explaining hand shake blur correction after panning is performed.

In the frame n shown on the left-hand side of FIG. 19A, the end point 41' of a correction amount $93_n$ for the frame n starting at the designated position 41 (and a correction amount candidate for the frame n) exists within a correction area $96_n$ for the frame n.

Thus, the correction amount control part 65 supplies the correction amount $93_n$ for the frame n as an actual correction amount $98_n$ for the frame n to the corrected image generation part 66.

For the frame n, the corrected image generation part 66 extracts an extracted image 41'a on the basis of the actual correction amount $98_n$ for the frame n supplied from the correction amount control part 65, and enlarges the extracted image 41'a. Accordingly, the corrected image generation part 66 generates a corrected image where the object 121 is displayed, as shown on the right-hand side of FIG. 19A, and outputs the generated corrected image.

Figure 19B:
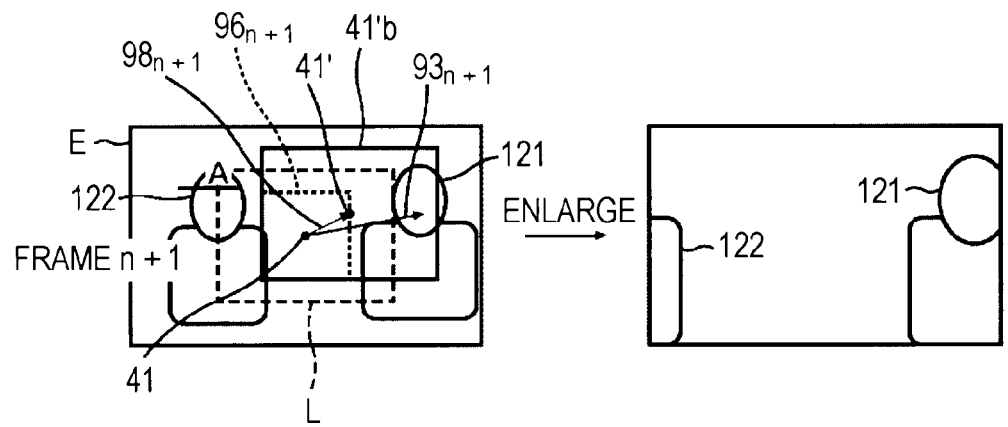

In the frame n+1 shown on the left-hand side of FIG. 19B, the end point of a correction amount $93_{n+1}$ for the frame n+1 (and a correction amount candidate for the frame n+1) does not exist within a correction area $96_{n+1}$ for the frame n+1.

Thus, the correction amount control part 65 limits the correction amount $93_{n+1}$ for the frame n+1 on the basis of the correction area $96_{n+1}$ for the frame n+1, and supplies the limited correction amount for the frame n+1 as an actual correction amount $98_{n+1}$ for the frame n+1 to the corrected image generation part 66.

For the frame n+1, the corrected image generation part 66 extracts an extracted image 41'b on the basis of the actual correction amount $98_{n+1}$ for the frame n+1 supplied from the correction amount control part 65, and enlarges the extracted image 41'b. Accordingly, the corrected image generation part 66 generates a corrected image where the objects 121 and 122 are displayed, as shown on the right-hand side of FIG. 19B, and outputs the generated corrected image.

Here, in the corrected image generated for the frame n+1, the position of the object 121 in the corrected image for the frame n has been displaced to the right because of an intentional panning operation performed by a user.

Figure 20A:
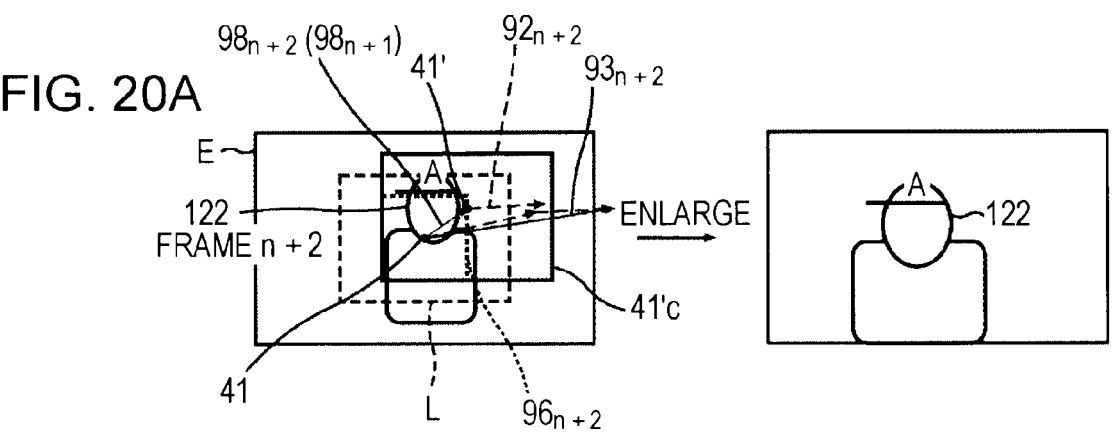
FIGS. 20A and 20B are second diagrams for explaining hand shake blur correction after panning is performed.

In the frame n+2 shown on the left-hand side of FIG. 20A, the end point of a correction amount candidate for the frame n+2 (that is, the result of addition of the actual correction amount $98_{n+1}$ for the frame n+1 and a motion vector $92_{n+2}$ for the frame n+2) and the end point of a correction amount $93_{n+2}$ for the frame n+2 do not exist within a correction area $96_{n+2}$ for the frame n+2.

Thus, the correction amount control part 65 limits the correction amount $93_{n+2}$ for the frame n+2 on the basis of the correction area $96_{n+2}$ for the frame n+2, and supplies the limited correction amount for the frame n+2 as an actual correction amount $98_{n+2}$ for the frame n+2 to the corrected image generation part 66.

For the frame n+2, the corrected image generation part 66 extracts an extracted image $41'c$ on the basis of the actual correction amount $98_{n+2}$ for the frame n+2 supplied from the correction amount control part 65, and enlarges the extracted image $41'c$. Accordingly, the corrected image generation part 66 generates a corrected image where the object 122 is displayed, as shown on the right-hand side of FIG. 20A, and outputs the generated corrected image.

Here, in the corrected image generated for the frame n+2, the position of the object 122 in the corrected image for the frame n+1 has been displaced to the right because of an intentional panning operation performed by the user.

Figure 20B:
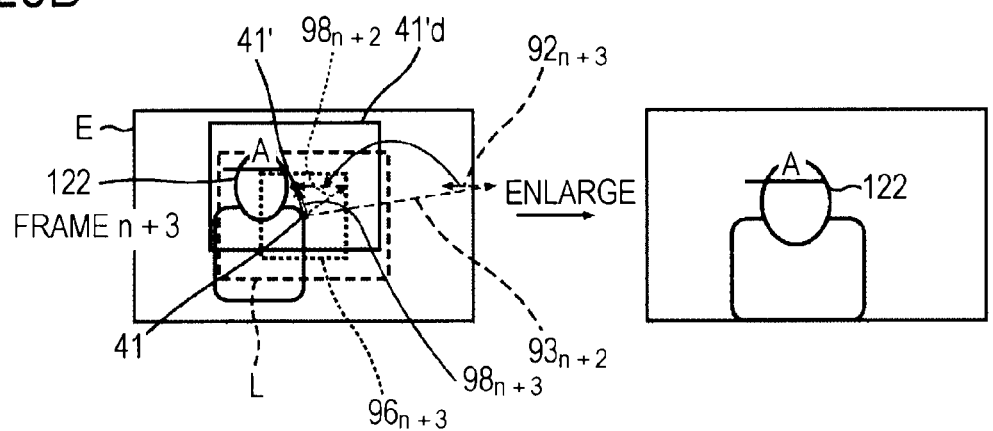

In the frame n+3 shown on the left-hand side of FIG. 20B, the end point 41' of a correction amount candidate for the frame n+3 (that is, the result of addition of the actual correction amount $98_{n+2}$ for the frame n+2 and a motion vector $92_{n+3}$ for the frame n+3) exists within a correction area $96_{n+3}$ for the frame n+3, and the end point 41' of the correction amount candidate for the frame n+3 is different from the end point of a correction amount $93_{n+3}$ for the frame n+3 (that is, the result of addition of the correction amount $93_{n+2}$ for the frame n+2 and the motion vector $92_{n+3}$ for the frame n+3).

Thus, the correction amount control part 65 supplies the correction amount candidate for the frame n+3 as an actual correction amount $98_{n+3}$ for the frame n+3 to the correction amount generation part 61 and the corrected image generation part 66.

For the frame n+3, the corrected image generation part 66 extracts an extracted image $41'd$ on the basis of the actual correction amount $98_{n+3}$ for the frame n+3 supplied from the correction amount control part 65, and enlarges the extracted image $41'd$. Accordingly, the corrected image generation part 66 generates a corrected image where the object 122 is displayed, as shown on the right-hand side of FIG. 20B, and outputs the generated corrected image.

Here, in the corrected image generated for the frame n+3, the position of the object 122 in the corrected image for the frame n+2 is maintained.

That is, for the frame n+3, the correction amount candidate for the frame n+3 is generated as a correction amount by which position displacement of the frame n+3 relative to the frame n+2 is to be corrected.

Then, the actual correction amount $98_{n+3}$ for the frame n+3 is determined from the correction amount candidate for the frame n+3 on the basis of the correction area $96_{n+3}$ for the frame n+3. Thus, the actual correction amount $98_{n+3}$ for the frame n+3 is an amount by which hand shake blur in the frame n+3 relative to the frame n+2 is to be corrected.

As described above, the corrected image generation part 66 generates a corrected image where hand shake blur in the frame n+3 relative to the frame n+2 has been corrected. Thus, the position of the object 122 in the corrected image generated for the frame n+3 is the same as the position of the object 122 in the corrected image for the frame n+2.

Note that, in response to supply of the actual correction amount $98_{n+3}$ for the frame n+3 from the correction amount control part 65, the correction amount generation part 61 sets the end point 41' of the actual correction amount $98_{n+3}$ for the frame n+3 as a new designated position, sets the frame n+3 as a reference frame, and performs a hand shake blur correction process for correcting hand shake blur relative to the new reference frame.

A hand shake blur correction process performed by the image processing apparatus 1 shown in FIG. 1 will be described with reference to a flowchart shown in FIG. 21.

In step S31, the motion vector detection unit 31 detects motion vectors for individual frames constituting a supplied moving image, and supplies the detected motion vectors to the hand shake blur correction unit 32.

In steps S32 to S37, the hand shake blur correction unit 32 performs a corrected image generation process for correcting, on the basis of the motion vectors for the individual frames supplied from the motion vector detection unit 31, hand shake blur in the supplied moving image caused by hand shake blur occurring at the time of capturing the image and generating a resultant corrected image.

That is, in step S32, the correction amount generation part 61 of the hand shake blur correction unit 32 performs a correction amount generation process for generating a correction amount $93_n$ for a frame n on the basis of the motion vectors for the individual frames supplied from the motion vector detection unit 31, and supplies the obtained correction amount $93_n$ for the frame n to the hand shake blur area estimation part 62, the panning/tilting detection part 63, and the correction amount control part 65.

In step S32, the correction amount generation part 61 also supplies, to the correction amount control part 65, a motion vector $92_n$ for the frame n supplied from the motion vector detection unit 31.

In step S33, the hand shake blur area estimation part 62 performs a hand shake blur area estimation process for estimating a hand shake blur area on the basis of a correction amount $93_{n-1}$ for a frame n−1 and the correction amount $93_n$ for the frame n supplied from the correction amount generation part 61.

In step S33, only in a case where a hand shake blur area $95_{n-1}$ estimated on the basis of the correction amount $93_{n-1}$ for the frame n−1 and the correction amount $93_n$ for the frame n in accordance with the hand shake blur area estimation process is acquired, the hand shake blur area estimation part 62 also supplies the hand shake blur area $95_{n-1}$ and component information on the correction amount $93_{n-1}$ for the frame n−1 to the correction area determination part 64.

In step S34, the panning/tilting detection part 63 performs a panning/tilting detection process for detecting occurrence of an intentional picture composition changing operation at the time of capturing the frame n on the basis of the correction amount $93_n$ for the frame n supplied from the correction amount generation part 61, and supplies the result of the detection to the correction area determination part 64.

In step S35, the correction area determination part 64 performs a correction area determination process for determining a correction area $96_n$ for the frame n on the basis of the hand shake blur area and the component information supplied from the hand shake blur area estimation part 62 and the result of the detection supplied from the panning/tilting detection part 63, and supplies the obtained correction area $96_n$ for the frame n to the correction amount control part 65.

In step S36, the correction amount control part 65 performs, on the basis of the correction amount $93_n$ for the frame n and the motion vector $92_n$ for the frame n supplied from the correction amount generation part 61 and the correction area $96_n$ for the frame n supplied from the correction area determination part 64, a correction amount control process for generating an actual correction amount $98_n$ by which hand shake blur in the frame n is to be corrected, and supplies the obtained actual correction amount $98_n$ for the frame n to the corrected image generation part 66.

In step S37, the corrected image generation part 66 generates, on the basis of the actual correction amount $98_n$ for the frame n supplied from the correction amount control part 65, a corrected image where hand shake blur in the supplied frame n has been corrected.

That is, for example, in step S37, by extracting an image from the frame n on the basis of an extracted box e centered on the end point 41' of the actual correction amount $98_n$ for the frame n and enlarging the extracted image, the corrected image generation part 66 generates and outputs a corrected image for the frame n, as shown in FIGS. 17A to 17C.

As described above, after a corrected image is generated and output for each of the individual frames constituting a moving image in accordance with the corrected image generation process in steps S32 to S37, the hand shake blur correction process ends.

The correction amount generation process performed by the correction amount generation part 61 shown in FIG. 5 in step S32 of FIG. 21 will be described in detail with reference to a flowchart shown in FIG. 22.

In step S61, the correction amount generation part 61 determines whether or not a new designated position 41 for a frame n has been designated by a user. In a case where it is determined that a new designated position 41 has been designated, the process proceeds to step S62.

In step S62, the correction amount generation part 61 initializes a correction amount $93_{n-1}$ for a frame n−1 to 0, and sets the frame n−1 as a new reference frame. Then, the process proceeds to step S63.

Meanwhile, in a case where it is determined in step S61 that a new designated position 41 has not been designated, the processing of step S62 is skipped and the process proceeds to step S63.

In step S63, the correction amount generation part 61 determines whether or not an actual correction amount $98_{n-1}$ for the frame n−1 has been fed back from the correction amount control part 65. In a case where it is determined that the actual correction amount $98_{n-1}$ for the frame n−1 has been fed back, the process proceeds to step S64. In step S64, the correction amount generation part 61 sets the end point of the actual correction amount $98_{n-1}$ for the frame n−1 supplied from the correction amount control part 65 as a new designated position, and sets the frame n−1 as a new reference frame. Then, in step S65, the correction amount generation part 61 generates a correction amount $93_1$ for a frame 1.

Meanwhile, in a case where it is determined in step S63 that the actual correction amount $98_{n-1}$ for the frame n−1 has not been fed back, the processing of step S64 is skipped and the process proceeds to step S65. In step S65, as shown in FIG. 6, the correction amount generation part 61 adds a correction amount for the frame n−1 stored in the internal memory to a motion vector for the frame n supplied from the motion vector detection unit 31, and sets the result of the addition as a correction amount $93_n$ for the frame n. Note that, for the frame 1, a motion vector $92_1$ for the frame 1 is directly set as a correction amount $93_1$ for the frame 1.

After the correction amount generation process is performed as described above, the correction amount generation part 61 supplies the correction amount $93_n$ for the frame n, which has been obtained in accordance with the correction amount generation process, to the hand shake blur area estimation part 62, the panning/tilting detection part 63, and the correction amount control part 65. Then, the correction amount generation process returns to step S32 of FIG. 21.

The hand shake blur area estimation process performed by the hand shake blur area estimation part 62 shown in FIG. 5 in step S33 of FIG. 21 will be described in detail with reference to a flowchart shown in FIG. 23.

In step S91, the hand shake blur area estimation part 62 determines whether or not a horizontal component or a vertical component of the correction amount $93_n$ for the frame n supplied from the correction amount generation part 61 is smaller than a corresponding component of the correction amount $93_{n-1}$ for the frame n−1 previously supplied from the correction amount generation part 61.

In a case where it is determined in step S91 that at least one of the horizontal component and the vertical component of the correction amount $93_n$ for the frame n is smaller than the corresponding component of the correction amount $93_{n-1}$ for the frame n−1 previously supplied from the correction amount generation part 61, the process proceeds to step S92. In step S92, the hand shake blur area estimation part 62 estimates a hand shake blur area on the basis of the correction amount $93_{n-1}$ for the frame n−1, as shown in FIG. 7.

In step S92, the hand shake blur area estimation part 62 also detects, as component information, the component of the correction amount $93_{n-1}$ for the frame n−1 that is greater than the corresponding component of the correction amount $93_n$ for the frame n. Then, the hand shake blur area estimation process ends.

Note that, in a case where it is determined in step S91 that both the horizontal component and the vertical component of the correction amount $93_n$ for the frame n supplied from the correction amount generation part 61 are equal to or greater than the horizontal component and the vertical component of the correction amount $93_{n-1}$ for the frame n−1 previously supplied from the correction amount generation part 61, the processing of step S92 is skipped and the hand shake blur area estimation process ends.

After the hand shake blur estimation process is performed as described above, only in a case where it is determined that a hand shake blur area is estimated and component information is detected in the hand shake blur area estimation process, the hand shake blur area estimation part 62 supplies the hand shake blur area and the component information to the correction area determination part 64. Then, the hand shake blur area estimation process returns to step S33 of FIG. 21.

Figure 24:
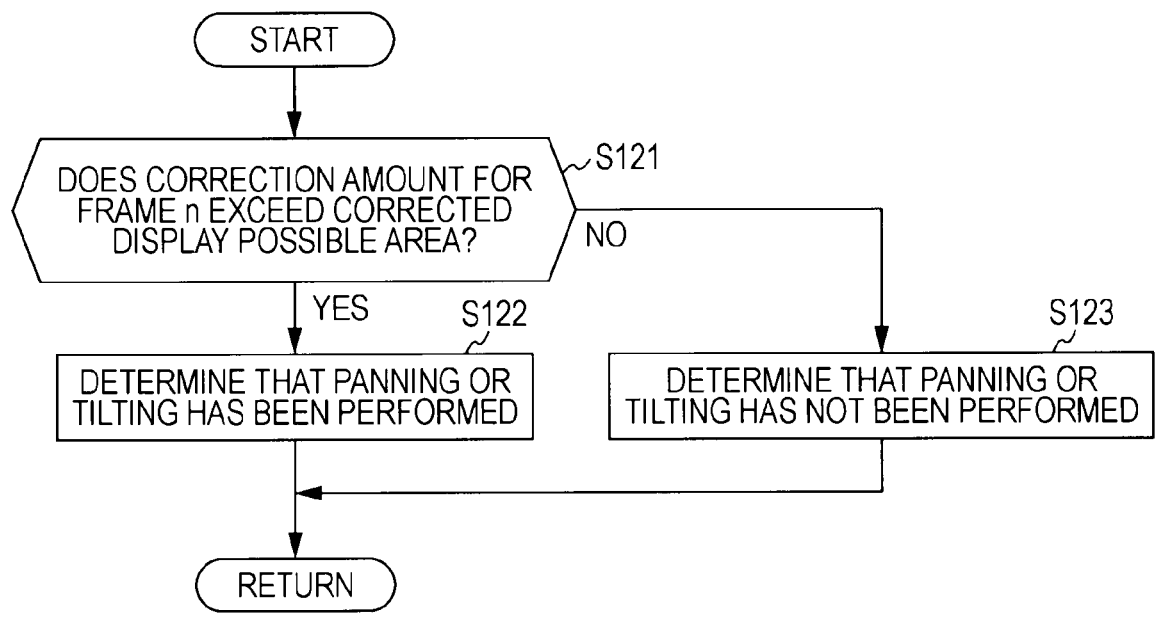
FIG. 24 is a flowchart for explaining a panning/tilting detection process.

The panning/tilting detection process performed by the panning/tilting detection part 63 shown in FIG. 5 in step S34 of FIG. 21 will be described in detail with reference to a flowchart shown in FIG. 24.

In step S121, the panning/tilting detection part 63 determines whether or not the end point of the correction amount $93_n$ for the frame n supplied from the correction amount generation part 61 is located outside the corrected display possible area L.

In a case where it is determined in step S121 that, as shown in FIG. 8, the end point of the correction amount $93_n$ for the frame n is located outside the corrected display possible area L, the process proceeds to step S122. In step S122, the panning/tilting detection part 63 determines that an intentional picture composition changing operation was performed at the time of capturing the frame n. Then, the panning/tilting detection process ends.

Meanwhile, in a case where it is determined in step S121 that the end point of the correction amount $93_n$ for the frame n is located within the corrected display possible area L, the process proceeds to step S123. In step S123, the panning/tilting detection part 63 determines that no intentional picture composition changing operation was performed at the time of capturing the frame n. Then, the panning/tilting detection process ends.

After the panning/tilting detection process is performed as described above, the panning/tilting detection part 63 supplies the result of the determination as the result of the panning/tilting detection process to the correction area determination part 64. Then, the panning/tilting detection process returns to step S34 of FIG. 21.

The correction area determination process performed by the correction area determination part 64 shown in FIG. 5 in step S35 of FIG. 21 will be described in detail with reference to a flowchart shown in FIG. 25.

In step S151, the correction area determination part 64 sets a correction area $96_n$ for the frame n on the basis of the result of the correction area determination process previously performed to determine a correction area $96_{n-1}$ for the frame n−1.

In step S152, the correction area determination part 64 determines whether or not the correction area $96_n$ for the frame n extends beyond the corrected display possible area L.

In a case where it is determined in step S152 that the correction area $96_n$ for the frame n extends beyond the corrected display possible area L because, for example, the size of the corrected display possible area L has been reduced in accordance with a key operation by a user, the process proceeds to step S153. In step S153, as shown in FIG. 12, the correction area determination part 64 reduces the size of the correction area $96_n$ for the frame n to a correction area $97_n$ so as to fall within the corrected display possible area L, and sets the correction area $97_n$ as a new correction area. Then, the process proceeds to step S154.

Meanwhile, in a case where it is determined in step S152 that the correction area $96_n$ for the frame n falls within the corrected display possible area L, the processing of step S153 is skipped and the process proceeds to step S154.

Figure 21:
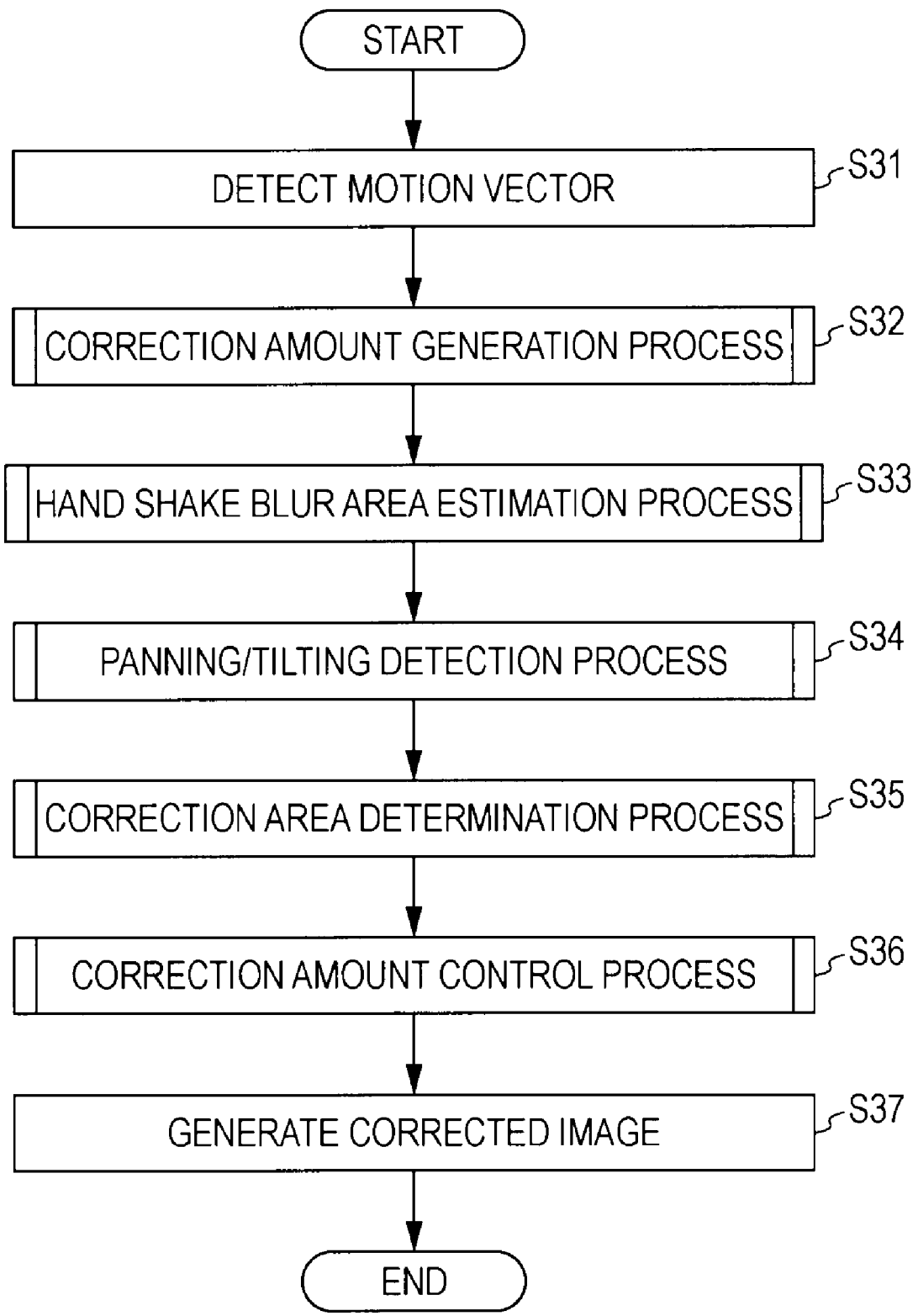
FIG. 21 is a flowchart for explaining a hand shake blur correction process.
Figure 22:
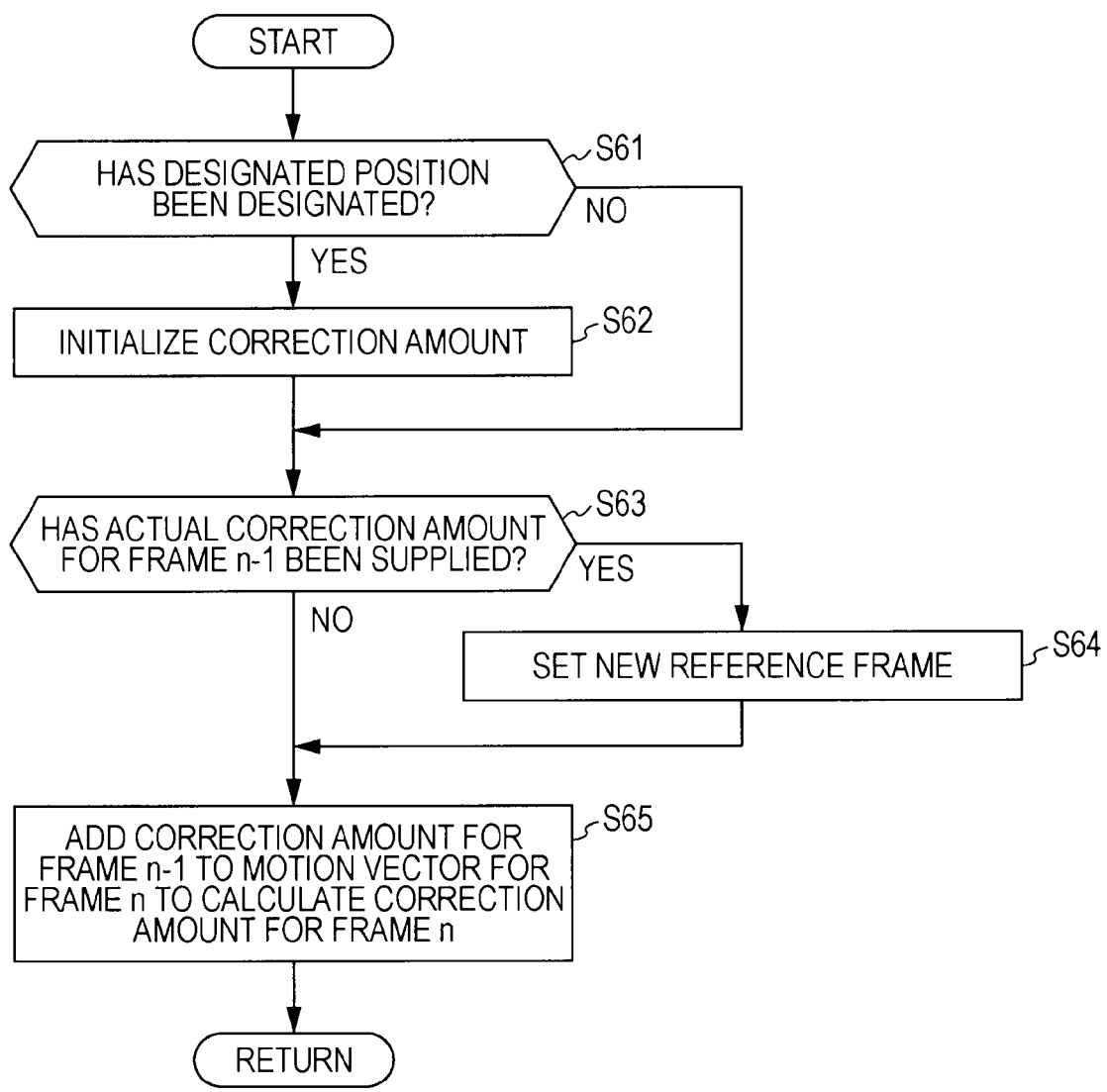
FIG. 22 is a flowchart for explaining a correction amount generation process.

In step S154, the correction area determination part 64 determines whether or not a hand shake blur area $95_{n-1}$ estimated on the basis of the correction amount $93_{n-1}$ for the frame n−1 and the correction amount $93_n$ for the frame n and component information have been supplied from the hand shake blur area estimation part 62, that is, whether or not a hand shake blur area $95_{n-1}$ estimated in accordance with the hand shake blur area estimation process performed in step S33 of FIG. 21 and component information have been supplied.

In a case where it is determined in step S154 that the hand shake blur area $95_{n-1}$ and the component information have been supplied, the process proceeds to step S155. In step S155, the correction area determination part 64 determines whether or not the hand shake blur area $95_{n-1}$ supplied from the hand shake blur area estimation part 62 extends beyond the correction area $96_n$ for the frame n.

In a case where it is determined in step S155 that the hand shake blur area $95_{n-1}$ extends beyond the correction area $96_n$ for the frame n, the process proceeds to step S156. In step S156, the correction area determination part 64 determines, on the basis of the result of detection performed by the panning/tilting detection part 63, whether or not occurrence of an intentional picture composition changing operation at the time of capturing the frame n−1 corresponding to the correction amount $93_{n-1}$ used for estimation of the hand shake blur area $95_{n-1}$ has been detected.

In a case where it is determined in step S156 that an intentional picture composition changing operation at the time of capturing the frame n−1 has not been detected, the process proceeds to step S157. In step S157, the correction area determination part 64 enlarges the correction area $96_n$ for the frame n to the correction area $97_n$ on the basis of the hand shake blur area $95_{n-1}$ and the component information supplied from the hand shake blur area estimation part 62, as shown in FIGS. 10 and 11. Then, the correction area determination process ends. In this case, the correction area for the frame n is the correction area $96_n$ before being updated. In step S151 of the correction area determination process to determine a correction area $96_{n+1}$ for the next frame n+1, the updated correction area $97_n$ is set as a correction area $96_{n+1}$ for the frame n+1.

Note that, in a case where it is determined in step S154 that the hand shake blur area $95_{n-1}$ and the component information have not been supplied, in a case where it is determined in step S155 that the hand shake blur area $95_{n-1}$ falls within the correction area $96_n$ for the frame n, or in a case where it is determined in step S156 that occurrence of an intentional picture composition changing operation at the time of capturing the frame n−1 has been detected, the correction area determination process is terminated at the time of determination. In step S151 of the correction area determination process to determine the correction area $96_{n+1}$ for the next frame n+1, the correction area $96_n$ for the frame n is set as the correction area $96_{n+1}$ for the frame n+1.

After the correction area determination process is performed as described above, the correction area determination part 64 supplies the correction area for the frame n determined in accordance with the correction area determination process to the correction amount control part 65. Then, the correction area determination process returns to step S35 of FIG. 21.

Figure 26:
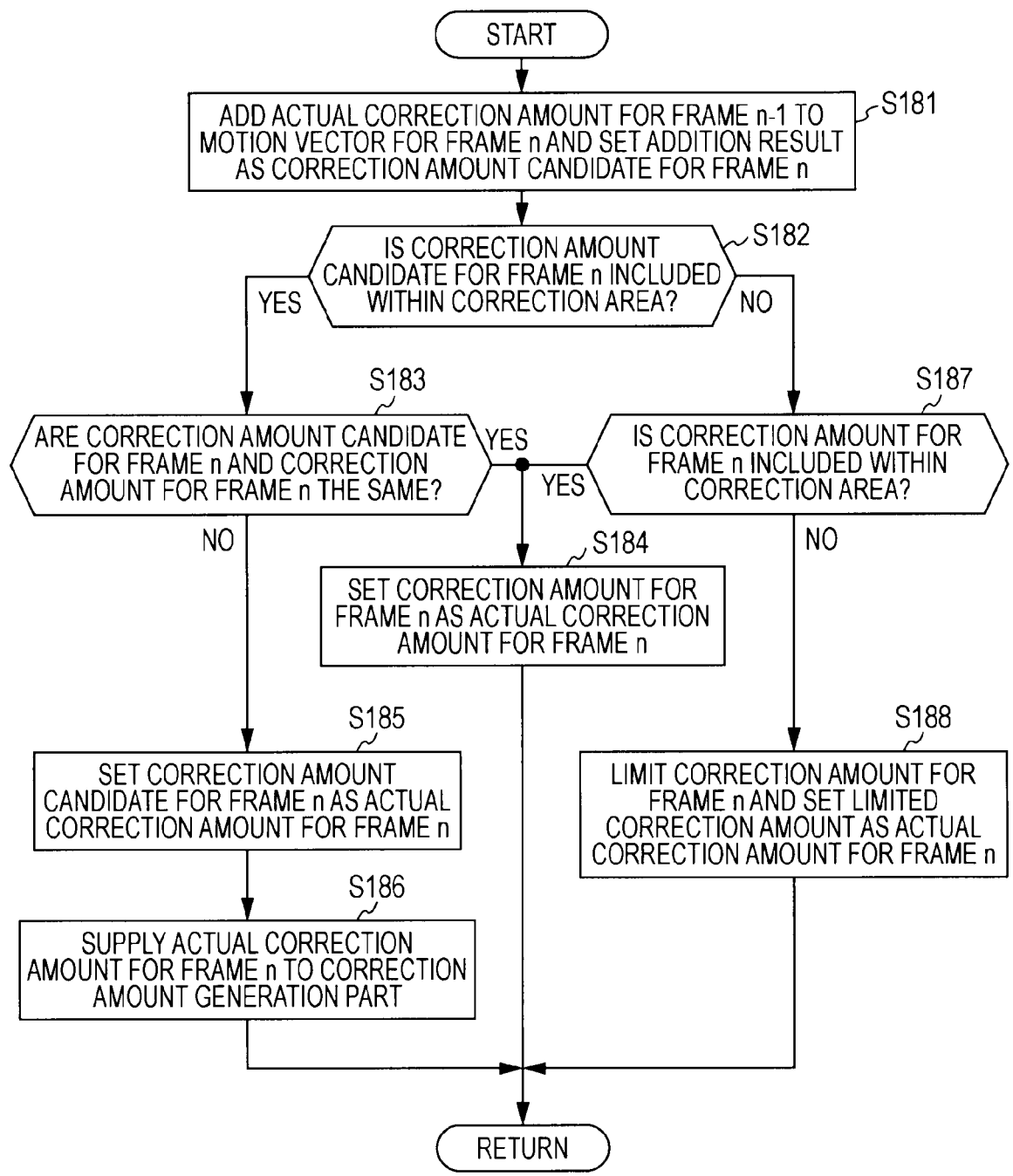
FIG. 26 is a flowchart for explaining a correction amount control process.

The correction amount control process performed by the correction amount control part 65 shown in FIG. 5 in step S36 of FIG. 21 will be described in detail with reference to a flowchart shown in FIG. 26.

In step S181, the correction amount control part 65 adds the actual correction amount $98_{n-1}$ for the frame n−1 to the motion vector $92_n$ for the frame n supplied from the correction amount generation part 61, and acquires the result of the addition as a correction amount candidate for the frame n.

In step S182, the correction amount control part 65 determines whether or not the end point of the correction amount candidate for the frame n starting at the designated position 41 exists within the correction area $96_n$ for the frame n supplied from the correction area determination part 64.

In a case where it is determined in step S182 that the end point of the correction amount candidate for the frame n exists within the correction area $96_n$ for the frame n, the process proceeds to step S183. In step S183, the correction amount control part 65 determines whether or not the correction amount candidate for the frame n starting at the designated position 41 is the same as the correction amount $93_n$ for the frame n starting at the designated position 41.

In a case where it is determined in step S183 that the correction amount candidate for the frame n is the same as the correction amount $93_n$ for the frame n, the process proceeds to step S184. In step S184, the correction amount control part 65 directly sets the correction amount $93_n$ for the frame n as the actual correction amount $98_n$ for the frame n, as shown in FIG. 14. Then, the correction amount control process ends.

Meanwhile, in a case where it is determined in step S183 that the correction amount candidate for the frame n is not the same as the correction amount $93_n$ for the frame n, the process proceeds to step S185. In step S185, the correction amount control part 65 directly sets the correction amount candidate for the frame n as the actual correction amount $98_n$ for the frame n, as shown in FIG. 16. Then, the process proceeds to step S186.

In step S186, the correction amount control part 65 feeds back the actual correction amount $98_n$ for the frame n to the correction amount generation part 61. Thus, in step S64 of the correction amount generation process shown in FIG. 22, the correction amount generation part 61 sets the end point of the actual correction amount $98_n$ for the frame n supplied from the correction amount control part 65 as a new designated position, sets the frame n as a new reference frame, and generates a correction amount. Then, the correction amount control process ends.

Meanwhile, in a case where it is determined in step S182 that the end point of the correction amount candidate for the frame n is not located within the correction area $96_n$ for the frame n, the process proceeds to step S187. In step S187, the correction amount control part 65 determines whether or not the end point of the correction amount $93_n$ for the frame n is located within the correction area $96_n$ for the frame n.

In a case where it is determined in step S187 that the end point of the correction amount $93_n$ for the frame n is located within the correction area $96_n$ for the frame n, the process proceeds to step S184.

Meanwhile, in a case where it is determined in step S187 that the end point of the correction amount $93_n$ for the frame n is not located within the correction area $96_n$ for the frame n, the process proceeds to step S188. In step S188, the correction amount control part 65 limits the correction amount $93_n$ for the frame n on the basis of the correction area $96_n$ for the frame n, as shown in FIG. 15, and sets the limited correction amount as the actual correction amount $98_n$ for the frame n. Then, the correction amount control process ends.

After the correction amount control process is performed as described above, the correction amount control part 65 supplies the actual correction amount $98_n$ for the frame n obtained in accordance with the correction amount control process to the corrected image generation part 66. Then, the correction amount control process returns to step S36 of FIG. 21.

In steps S32 to S37 of the hand shake blur correction process shown in FIG. 21 (that is, the corrected image generation process), a hand shake blur area caused by hand shake of a photographer who captured a moving image is estimated on the basis of a correction amount $93_n$ for a frame n, and a correction area is determined on the basis of the hand shake blur area. Thus, an optimal correction area used for correcting hand shake blur, the degree of which differs from photographer to photographer, can be determined.

In addition, in the hand shake blur correction process shown in FIG. 21, a corrected image is generated by enlarging an image extracted from the frame n to a specific size on the basis of the actual correction amount $98_n$ for the frame n. Thus, the size of an object within the corrected image is greater than the size of the object within a captured image (frame n).

As described above, in the hand shake blur correction process shown in FIG. 21, an object within a captured image is enlarged. Thus, compared with a case where hand shake blur is simply corrected without using an enlarged image as a corrected image, the amount of zooming (the scale of enlargement) of the camera at the time of capturing an image can be reduced. Thus, a large amount of hand shake blur that is likely to occur when the camera zooms in on an object at the time of capturing an image of the object can be reduced.

Figure 25:
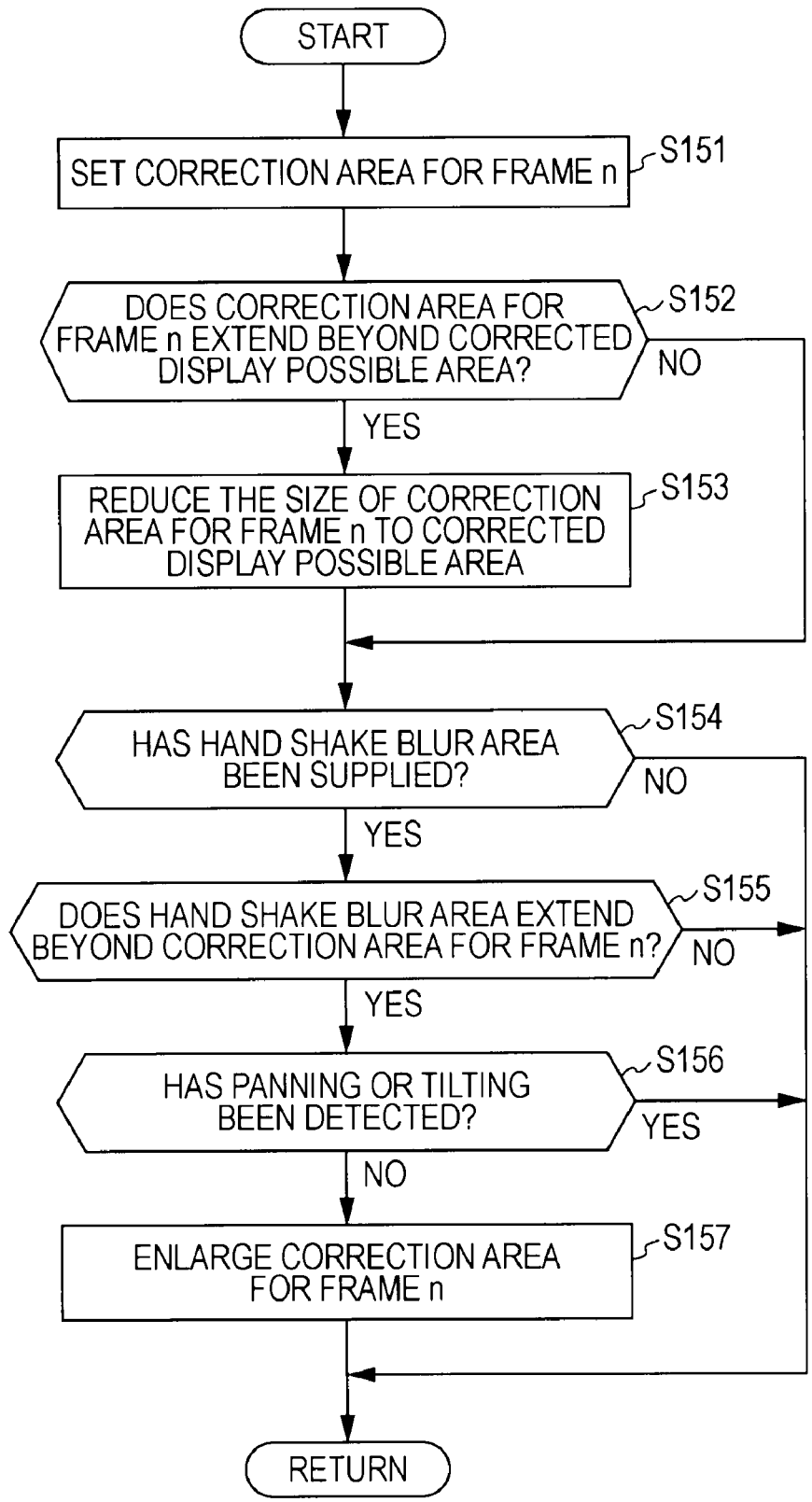
FIG. 25 is a flowchart for explaining a correction area determination process.

In the correction area determination process shown in FIG. 25, the correction area $96_n$ for the frame n is enlarged on the basis of the hand shake blur area $95_{n-1}$. However, in a case where the hand shake blur area $95_{n-1}$ estimated in accordance with the hand shake blur area estimation process shown in FIG. 23 falls within the correction area and, for example, the correction area has not been enlarged during a predetermined period of time, that is, hand shake blur has occurred within an area smaller than the correction area where hand shake blur is to be corrected, it is desirable that the size of the correction area be reduced.

A first reduction method for reducing the size of a correction area with a specific reduction ratio in a case where the correction area has not been enlarged during a predetermined period of time will be described with reference to FIG. 27.

Figure 27:
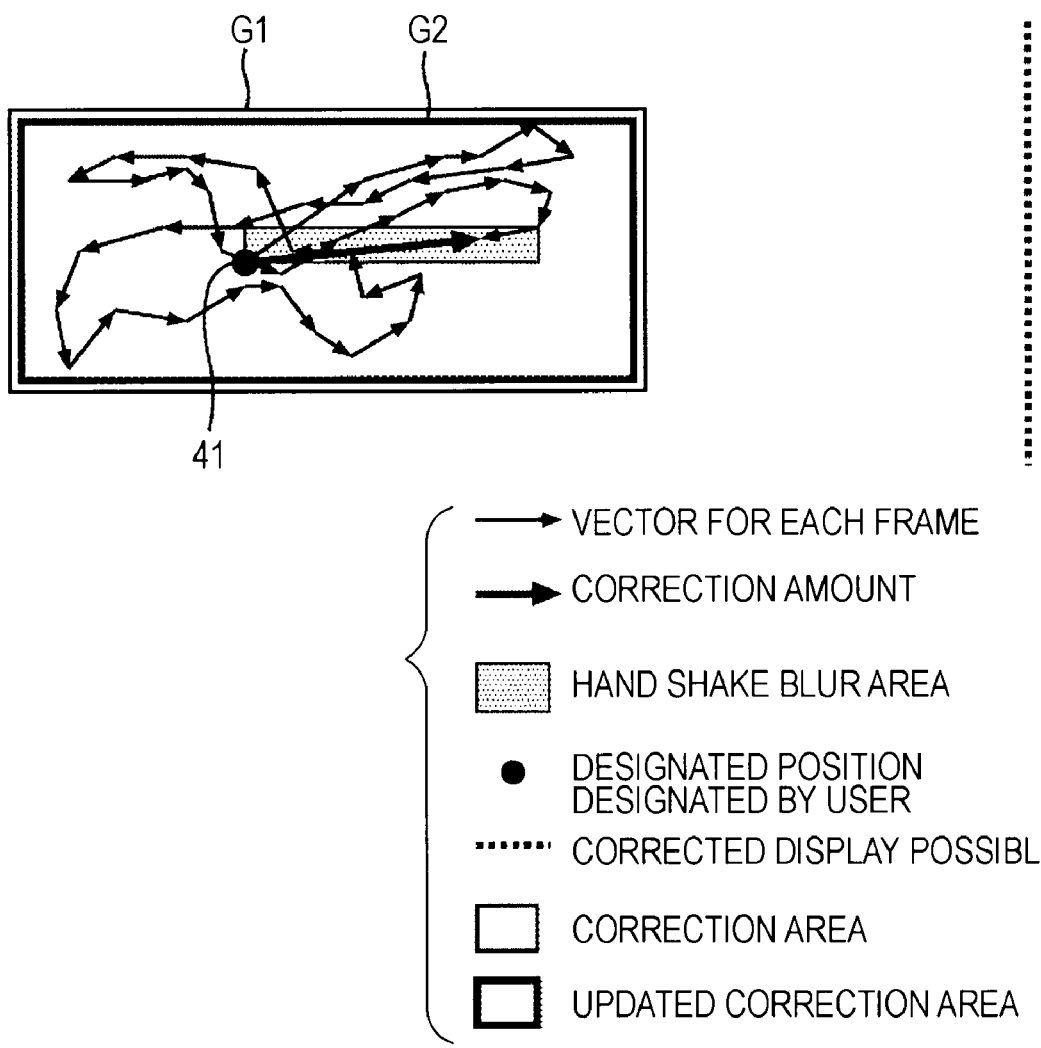
FIG. 27 is an explanatory diagram for explaining a first reduction method for a correction area.

As shown in FIG. 27, in a case where a correction area $G_1$ has not been enlarged during a predetermined period of time, the correction area determination part 64 reduces the size of the correction area $G_1$ defined by four sides in such a manner that the lengths of all the four sides are reduced with the same ratio, and updates the correction area $G_1$ to a reduced correction area $G_2$.

In addition, a second reduction method for reducing the size of a correction area on the basis of the distribution of the previous correction amounts in a case where the correction area has not been enlarged during a predetermined period of time will be described with reference to FIG. 28.

Figure 28:
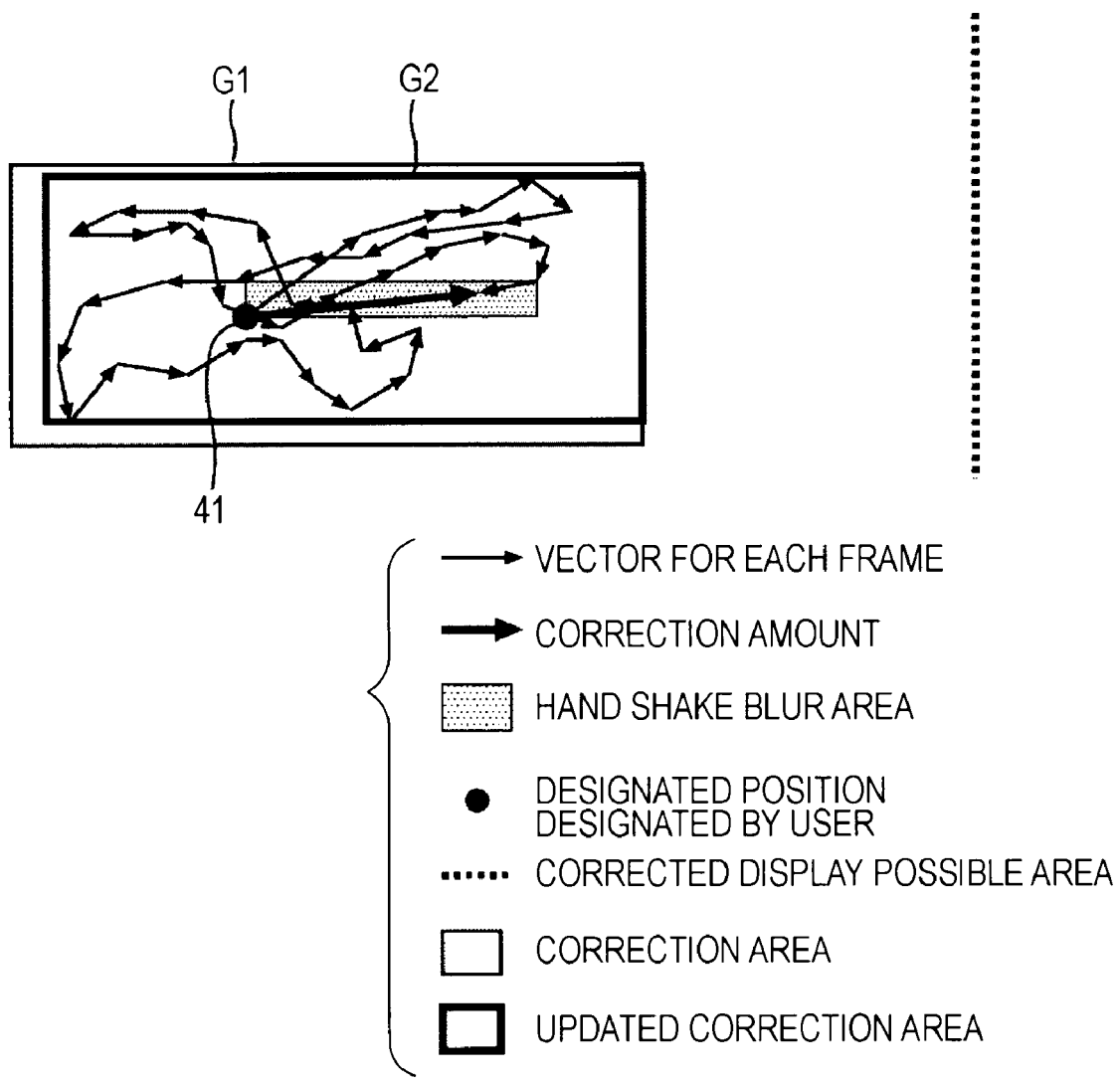
FIG. 28 is an explanatory diagram for explaining a second reduction method for a correction area.

As shown in FIG. 28, in a case where the correction area $G_1$ has not been enlarged during a predetermined period of time, when, for example, the distribution of end points of the previous correction amounts starting at the designated position 41 in the correction area $G_1$ is dense in an area to the right of the designated position 41 in the correction area $G_1$ and the distribution of end points of the previous correction amounts is sparse in an area to the left of the designated position 41, the correction area determination part 64 reduces the size of the correction area $G_1$ in such a manner that the area to the left of the designated position 41 is contracted by the greatest amount, and updates the correction area $G_1$ to the reduced correction area $G_2$.

Another correction area determination process to reduce the size of a correction area in a case where the correction area has not been enlarged during a predetermined period of time will be described with reference to a flowchart shown in FIG. 29.

Figure 29:
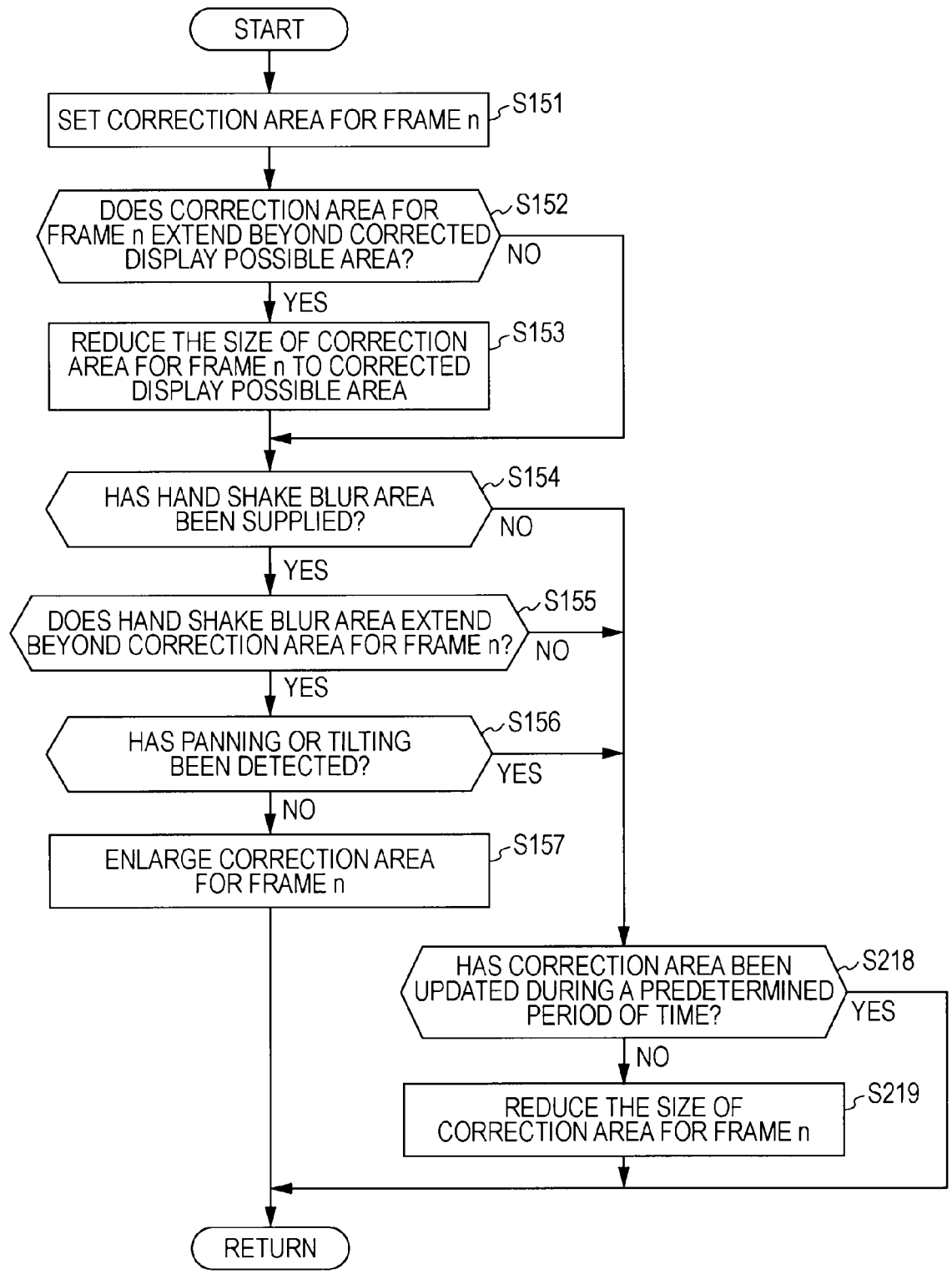
FIG. 29 is a flowchart for explaining another correction area determination process.

The correction area determination process shown in FIG. 29 is a process where steps S218 and S219 are added to the correction area determination process shown in FIG. 25.

That is, in a case where it is determined in step S154 that a hand shake blur area $95_{n-1}$ and component information have not been supplied, in a case where it is determined in step S155 that the hand shake blur area $95_{n-1}$ falls within the correction area $96_n$ for the frame n, or in a case where it is determined in step S156 that occurrence of an intentional picture composition changing operation at the time of capturing the frame n-1 has been detected, the process proceeds to step S218.

In step S218, the correction area determination part 64 determines whether or not the correction area has been enlarged during a predetermined period of time.

In a case where it is determined in step S218 that the correction area has been enlarged during the predetermined period of time, the processing of step S219 is skipped and the correction area determination process ends. In step S151 of the correction area determination process to determine a correction area $96_{n+1}$ for the next frame n+1, the correction area $96_n$ for the frame n is set as the correction area $96_{n+1}$ for the frame n+1.

Meanwhile, in a case where it is determined in step S218 that the correction area has not been enlarged during the predetermined period of time, the process proceeds to step S219. In step S219, the correction amount control part 65 updates the correction area $G_1$ for the frame n in such a manner that the correction area $G_1$ is reduced to a correction area $G_2$, as shown in FIG. 27 or 28. Then, the correction area determination process ends. In this case, the correction area $96_n$ for the frame n is the correction area $G_1$ before being reduced. In step S151 of the correction area determination process to determine the correction area $96_{n+1}$ for the next frame n+1, the reduced correction area $G_2$ is set as the correction area $96_{n+1}$ for the frame n+1.

After the correction area determination process shown in FIG. 29 is performed as described above, the correction area determination part 64 supplies the correction area for the frame n determined in accordance with the correction area determination process shown in FIG. 29 to the correction amount control part 65. Then, the correction area determination process returns to step S35 of FIG. 21.

Figure 23:
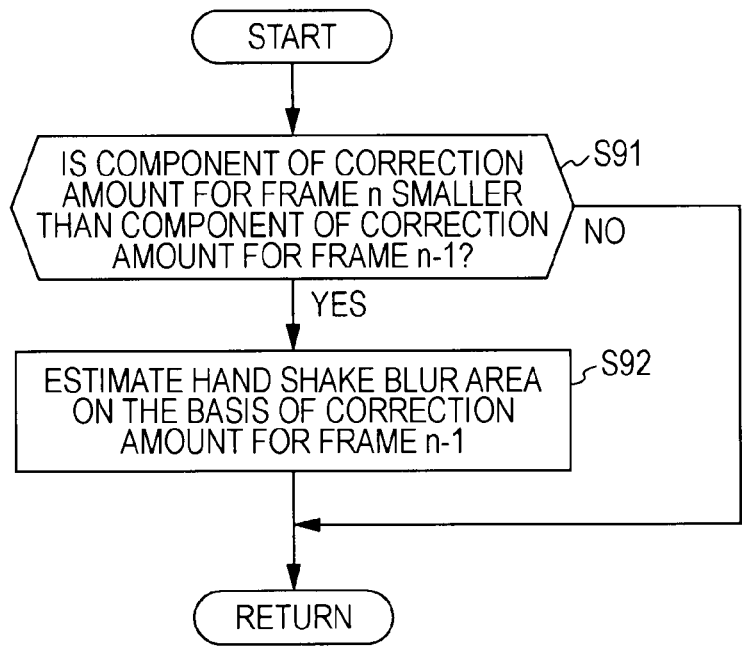
FIG. 23 is a flowchart for explaining a hand shake blur area estimation process.

In the correction area determination process shown in FIG. 29, in a case where a correction area has not been enlarged during a predetermined period of time since a hand shake blur area estimated in accordance with the hand shake blur area estimation process shown in FIG. 23 falls within the correction area, that is, in a case where hand shake blur has occurred in an area smaller than the correction area, the size of the correction area is reduced to approximate the area within which hand shake blur has occurred. Thus, more appropriate correction area can be determined.

Although a block matching method is used as a method for detecting a motion vector by the motion vector detection unit 31 shown in FIG. 1 in the embodiment described above, a gradient method may be used. Alternatively, a motion vector may be detected by using an acceleration sensor, an angular velocity sensor, or the like.

In addition, although a corrected image obtained by enlarging an image extracted on the basis of an extracted box e is used as a corrected image in the embodiment described above, the extracted image can be directly used as a corrected image. In this case, compared with a case where the extracted image is enlarged, processing for enlarging the extracted image can be omitted. Thus, a corrected image where hand shake blur has been corrected can be generated more quickly.

Furthermore, in the embodiment described above, a frame n that follows a frame 0, which serves as a reference frame, in the order in which frames were captured is subjected to the hand shake blur correction process. However, an nth frame, which is defined as a frame n, that follows the frame 0, which serves as a reference frame, in an order which is the reverse of the order in which frames were captured can be subjected to the hand shake blur correction process.

As an image processing apparatus according to an embodiment of the present invention, for example, a personal computer that includes a storage unit configured to store moving images and that performs the hand shake blur correction process for the moving images stored in the storage unit, a video camera that captures moving images and that performs the hand shake blur correction process for the captured moving images, or the like may be used.

In addition, in a case where such a video camera or the like is used as an image processing apparatus according to an embodiment of the present invention, by performing a hand shake blur correction process for each of captured frames every time each of the frames constituting a moving image is captured, hand shake blur occurring in the moving image can be corrected in real time.

The above-described series of processes performed by the image processing apparatus 1 shown in FIG. 1 can be performed by dedicated hardware or software. In a case where the series of processes are performed by software, a program constituting the software is installed from a program storage medium into a so-called built-in computer or, for example, a general-purpose personal computer that is capable of executing various functions on the basis of various programs being installed thereon.

Figure 30:
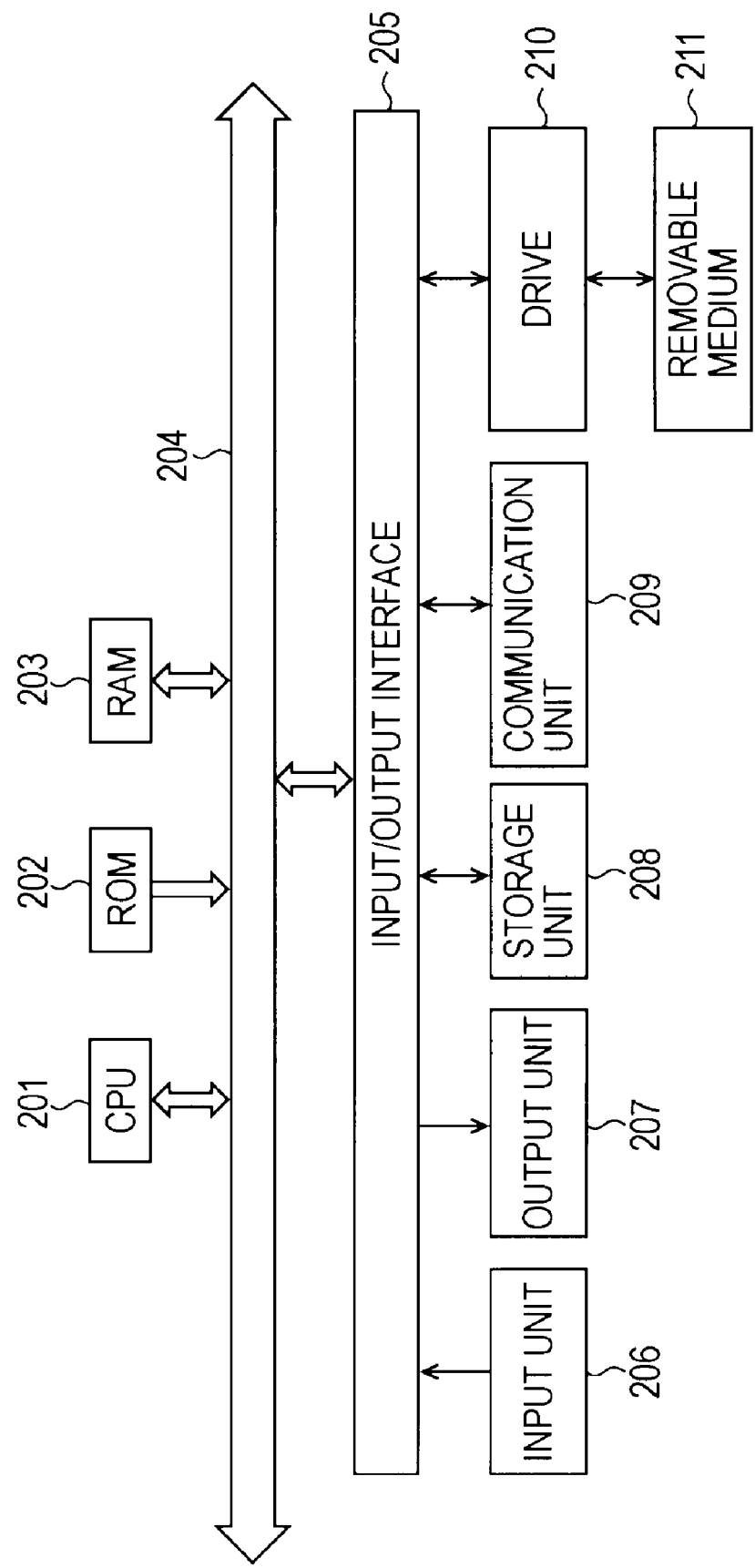
FIG. 30 is a block diagram showing an example of the configuration of a computer.

FIG. 30 is a block diagram showing an example of the configuration of a computer that performs the above-described series of processes on the basis of a program.

A central processing unit (CPU) 201 performs various processes in accordance with a program stored in a read-only memory (ROM) 202 or a storage unit 208. A program performed by the CPU 201, data, and the like are stored in a random-access memory (RAM) 203 in an appropriate manner. The CPU 201, the ROM 202, and the RAM 203 are connected to each other through a bus 204.

An input/output interface 205 is connected through the bus 204 to the CPU 201. An input unit 206 including a keyboard, a mouse, a microphone, and the like, and an output unit 207 including a display, a speaker, and the like, are connected to the input/output interface 205. The CPU 201 performs various processes in response to an instruction received by the input unit 206. Then, the CPU 201 outputs a processing result to the output unit 207.

The storage unit 208 connected to the input/output interface 205 includes, for example, a hard disk. The storage unit 208 stores a program performed by the CPU 201 and various data. A communication unit 209 communicates with an external apparatus via a network, such as the Internet or a local area network.

In addition, a program may be obtained through the communication unit 209 and stored in the storage unit 208.

When a removable medium 211, such as a magnetic disk, an optical disk, a magneto-optical disk, or a semiconductor memory, is installed in a drive 210 connected to the input/output interface 205, the drive 210 drives the removable medium 211 and obtains a program and data recorded in the removable medium 211. The obtained program and data are transferred to and stored in the storage unit 208 when necessary.

A program storage medium that is installed on a computer and that stores a program executable by the computer is constituted by the removable medium 211, which is a package medium, such as a magnetic disk (including a flexible disk), an optical disk (including a compact disc read-only memory (CD-ROM) or a digital versatile disc (DVD)), a magneto-optical disk (MD (Mini-Disc)), or a semiconductor memory, the ROM 202 in which a program is temporarily or permanently stored, or the hard disk forming the storage unit 208, as shown in FIG. 30. A program is stored into the program storage medium by using a wired or wireless communication medium, such as a local area network, the Internet, or digital satellite broadcasting, via the communication unit 209, which is an interface, such as a router or a modem, when necessary.

In the description, steps describing a program stored in the program storage medium include not only processing performed in time series in accordance with the written order but also processing performed in parallel or independently, the processing being not necessarily performed in time series.

Furthermore, an embodiment of the present invention is not limited to the above-described embodiments, and various changes can be made without departing from the gist of the present invention.

The present application contains subject matter related to that disclosed in Japanese Priority Patent Application JP 2008-096991 filed in the Japan Patent Office on Apr. 3, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus for correcting hand shake blur occurring at the time of capturing the moving image, comprising:
   generation means for generating, by setting a specific image among a plurality of images constituting the moving image as a reference image serving as a reference of a hand shake blur correction process and setting the remaining images as correction target images to be subjected to the hand shake blur correction process, a correction amount by which position displacement of a correction target image relative to the reference image is to be corrected;
   estimation means for estimating a hand shake blur area representing an area where hand shake blur relative to the reference image has occurred, on the basis of the correction amount generated by the generation means;
   detection means for detecting an intentional picture composition changing operation at the time of capturing the correction target image, on the basis of the correction amount generated by the generation means; and
   updating means for updating a set correction area to an area where hand shake blur in the correction target image relative to the reference image is to be corrected on the basis of the hand shake blur area estimated by the estimation means and a result of the detection performed by the detection means, wherein
   the correction target images follow the reference image in an order in which the images were captured, and
   in a case where at least one of a horizontal component and a vertical component of a correction amount for a first correction target image is greater than a corresponding component of a correction amount for a second correction target image following the first correction target image, the estimation means estimates the hand shake blur area on the basis of the correction amount for the first correction target image.

2. The image processing apparatus according to claim 1, wherein
   the detection means detects, on the basis of the correction amount for the first correction target image, whether or not at least one of panning and tilting was performed at the time of capturing the first correction target image, and
   the updating means updates the correction area for the second correction target image on the basis of the hand shake blur area estimated by the estimation means and the result of the detection performed by the detection means.

3. The image processing apparatus according to claim 1, further comprising:
   limiting means for limiting the correction amount for the correction target image to an actual correction amount by which the hand shake blur in the correction target image relative to the reference image is to be corrected, on the basis of the correction area; and
   correction means for generating a corrected image where the hand shake blur in the correction target image relative to the reference image has been corrected on the basis of the actual correction amount.

4. The image processing apparatus according to claim 3, wherein the correction means generates the corrected image by extracting a specific area within the correction target image on the basis of the actual correction amount and enlarging the extracted specific area.

5. The image processing apparatus according to claim 1, wherein, in a case where the correction area has not been updated during a predetermined period of time, the updating means reduces the size of the correction area.

6. The image processing apparatus according to claim 5, wherein, in a case where the correction area has not been updated during the predetermined period of time, the updating means reduces the size of the correction area on the basis of the distribution of correction amounts generated by the generation means.

7. The image processing apparatus according to claim 5, wherein, in a case where the correction area has not been updated during the predetermined period of time, the updating means reduces the size of the correction area with a specific reduction ratio.

8. The image processing apparatus according to claim 1, wherein in a case where the hand shake blur area estimated by the estimation means does not fall within the correction area and neither panning nor tilting at the time of capturing the correction target image has been detected by the detection means, the updating means updates the correction area on the basis of the hand shake blur area.

9. The image processing apparatus according to claim 1, further comprising capturing means for capturing the moving image.

10. An image processing method for use in an image processing apparatus for correcting hand shake blur occurring at the time of capturing the moving image, comprising the steps of:
    setting a specific image among a plurality of images constituting the moving image as a reference image serving as a reference of a hand shake blur correction process;
    generating, by setting the remaining images as correction target images to be subjected to the hand shake blur correction process, a correction amount by which position displacement of a correction target image relative to the reference image is to be corrected;
    estimating a hand shake blur area representing an area where hand shake blur relative to the reference image has occurred, on the basis of the generated correction amount;
    detecting an intentional picture composition changing operation at the time of capturing the correction target image, on the basis of the generated correction amount; and
    updating a set correction area to an area where hand shake blur in the correction target image relative to the reference image is to be corrected on the basis of the estimated hand shake blur area and a result of the detection, wherein
    the correction target images follow the reference image in an order in which the images were captured, and
    in a case where at least one of a horizontal component and a vertical component of a correction amount for a first correction target image is greater than a corresponding component of a correction amount for a second correction target image following the first correction target image, the estimating includes estimating the hand shake blur area on the basis of the correction amount for the first correction target image.

11. A non-transitory computer-readable medium including computer program instructions, which when executed by an image processing apparatus, cause the image processing apparatus to perform a method for correcting hand shake blur occurring at a time of capturing a moving image, the method comprising:

setting a specific image among a plurality of images constituting the moving image as a reference image serving as a reference of a hand shake blur correction process;

generating, by setting the remaining images as correction target images to be subjected to the hand shake blur correction process, a correction amount by which position displacement of a correction target image relative to the reference image is to be corrected;

estimating a hand shake blur area representing an area where hand shake blur relative to the reference image has occurred, on the basis of the generated correction amount;

detecting an intentional picture composition changing operation at the time of capturing the correction target image, on the basis of the generated correction amount; and updating a set correction area to an area where hand shake blur in the correction target image relative to the reference image is to be corrected on the basis of the estimated hand shake blur area and a result of the detection, wherein the correction target images follow the reference image in an order in which the images were captured, and in a case where at least one of a horizontal component and a vertical component of a correction amount for a first correction target image is greater than a corresponding component of a correction amount for a second correction target image following the first correction target image, the estimating includes estimating the hand shake blur area on the basis of the correction amount for the first correction target image.

12. An image processing apparatus for correcting hand shake blur occurring at the time of capturing the moving image, comprising:

a generation unit configured to generate, by setting a specific image among a plurality of images constituting the moving image as a reference image serving as a reference of a hand shake blur correction process and setting the remaining images as correction target images to be subjected to the hand shake blur correction process, a correction amount by which position displacement of a correction target image relative to the reference image is to be corrected;

an estimation unit configured to estimate a hand shake blur area representing an area where hand shake blur relative to the reference image has occurred, on the basis of the correction amount generated by the generation unit;

a detection unit configured to detect an intentional picture composition changing operation at the time of capturing the correction target image, on the basis of the correction amount generated by the generation unit; and an updating unit configured to update a set correction area to an area where hand shake blur in the correction target image relative to the reference image is to be corrected on the basis of the hand shake blur area estimated by the estimation unit and a result of the detection performed by the detection unit, wherein the correction target images follow the reference image in an order in which the images were captured, and in a case where at least one of a horizontal component and a vertical component of a correction amount for a first correction target image is greater than a corresponding component of a correction amount for a second correction target image following the first correction target image, the estimation unit estimates the hand shake blur area on the basis of the correction amount for the first correction target image.

* * * * *